United States Patent
Nammi

(10) Patent No.: US 11,108,446 B2
(45) Date of Patent: *Aug. 31, 2021

(54) FACILITATION OF RANK AND PRECODING MATRIX INDICATION DETERMINATIONS FOR MULTIPLE ANTENNA SYSTEMS WITH APERIODIC CHANNEL STATE INFORMATION REPORTING IN 5G OR OTHER NEXT GENERATION NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/661,056

(22) Filed: Oct. 23, 2019

(65) Prior Publication Data

US 2020/0059279 A1 Feb. 20, 2020

Related U.S. Application Data

(63) Continuation of application No. 16/238,051, filed on Jan. 2, 2019, now Pat. No. 10,491,280, which is a
(Continued)

(51) Int. Cl.
*H04B 7/04* (2017.01)
*H04B 7/0456* (2017.01)
(Continued)

(52) U.S. Cl.
CPC ........... *H04B 7/0486* (2013.01); *H04B 7/063* (2013.01); *H04B 7/0626* (2013.01);
(Continued)

(58) Field of Classification Search
CPC .. H04B 7/0486; H04B 1/3827; H04B 7/0626; H04L 5/0048
See application file for complete search history.

(56) References Cited

U.S. PATENT DOCUMENTS 8,179,775 B2  5/2012  Chen et al.
8,179,828 B2  5/2012  Cai et al.
(Continued)

FOREIGN PATENT DOCUMENTS

CA    2857481 A1   10/2015
WO    2009/107738 A1   9/2009

OTHER PUBLICATIONS

Sharawi et al., "An 800 MHz 2×1 Compact MIMO Antenna System for LTE Handsets", IEEE Transactions on Antennas and Propagation, Aug. 2011, pp. 3128-3131, vol. 59, No. 8, IEEE, 4 pages.
(Continued)

*Primary Examiner* — Freshteh N Aghdam
(74) *Attorney, Agent, or Firm* — Amin, Turocy & Watson, LLP

(57) ABSTRACT

Facilitating rank and precoding matrix indication determinations for multiple antennas systems with aperiodic channel state information reporting in a wireless communications system is provided herein. A method can comprise determining, by a mobile device comprising a processor, first channel state data of a channel based on a periodic configuration of the mobile device for first transmissions of the first channel state data periodically. The method can also comprise in response to receiving, from the network node device, reference signal data associated with a reference signal, determining, by the mobile device, second channel state data of the channel based on an aperiodic configuration of the mobile device for second transmissions of the second channel state data aperiodically. Further, the method can
(Continued)

comprise transmitting, by the mobile device, the aperiodic configuration of the mobile device to the network node device.

20 Claims, 20 Drawing Sheets

Related U.S. Application Data continuation of application No. 15/618,894, filed on Jun. 9, 2017, now Pat. No. 10,187,131.

(51) Int. Cl.
    *H04B 7/06*       (2006.01)
    *H04L 5/00*       (2006.01)
    *H04L 25/00*     (2006.01)

(52) U.S. Cl.
    CPC .......... *H04L 5/0048* (2013.01); *H04L 5/0051* (2013.01); *H04L 25/00* (2013.01)

(56) References Cited

U.S. PATENT DOCUMENTS

| | | | |
|---|---|---|---|
| 8,305,987 B2 | 11/2012 | Fong et al. | |
| 8,437,268 B2 | 5/2013 | Cai et al. | |
| 8,761,288 B2 | 6/2014 | Miao et al. | |
| 8,811,421 B2 | 8/2014 | Su et al. | |
| 8,818,438 B2 | 8/2014 | Yu et al. | |
| 8,825,069 B2 | 9/2014 | Koivisto et al. | |
| 8,868,144 B2 | 10/2014 | Shi | |
| 9,025,574 B2 | 5/2015 | Ebrahimi Tazeh Mahalleh et al. | |
| 9,184,511 B2 | 11/2015 | Ma et al. | |
| 9,270,347 B2 | 2/2016 | Fong et al. | |
| 9,294,310 B2 | 3/2016 | Wu et al. | |
| 9,331,830 B2 | 5/2016 | Hammarwall et al. | |
| 9,445,383 B2 | 9/2016 | Womack et al. | |
| 9,520,963 B2 | 12/2016 | Nammi et al. | |
| 9,537,551 B2 | 1/2017 | Nammi | |
| 9,572,130 B2 | 2/2017 | Ioffe et al. | |
| 10,523,285 B2* | 12/2019 | Davydov | H04L 5/0094 |
| 2014/0064201 A1 | 3/2014 | Zhu et al. | |
| 2014/0241274 A1 | 8/2014 | Lee et al. | |
| 2014/0241323 A1 | 8/2014 | Park et al. | |
| 2015/0016295 A1* | 1/2015 | Ebrahimi Tazeh Mahalleh | H04B 7/0626 370/252 |
| 2015/0131622 A1 | 5/2015 | Sahu et al. | |
| 2015/0289238 A1 | 10/2015 | Ji et al. | |
| 2016/0164591 A1* | 6/2016 | Zhang | H04L 1/003 370/329 |
| 2016/0373170 A1 | 12/2016 | Szini et al. | |
| 2017/0019163 A1* | 1/2017 | Yoshimoto | H04L 1/00 |
| 2017/0164226 A1* | 6/2017 | Wei | H04B 7/0469 |
| 2018/0138950 A1* | 5/2018 | Rahman | H04L 5/0057 |
| 2018/0262252 A1* | 9/2018 | Oh | H04L 5/0048 |

OTHER PUBLICATIONS

Sarasamba et al., "Evaluation of Smart Antenna for 3G Network: A Survey", Indian Journal of Engineering, Apr. 2014, pp. 24-32, vol. 10, No. 21, Discovery Publication, 9 pages.

Gao, "Channel State Information Fingerprinting Based Indoor Localization: a Deep Learning Approach", Aug. 2015, 81 pages. https://holocron.lib.aubum.edu/bitstream/handle/1 0415/4777/thesis.pdf?sequence=2&ts=1453815509088.

Fan et al., "New MAC Design to Accommodate Joint Detection Techniques in a MIMO-OFDM-based HIPERMAN System", The 13th IEEE Workshop on Local and Metropolitan Area Networks, 2004, pp. 223-228, IEEE, 6 pages.http://epubs.surrey.ac.uk/24321/1/SRF002687.pdf.

Auer et al., "Enabling Techniques for LTE-A and beyond", 60 pages. Retrieved on Mar. 23, 2017. http://projects.celtic-initiative.org/WINNER+WINNER+%20Deliverables/D2.2_v1.0.pdf.

Non-Final Office Action received for U.S. Appl. No. 15/618,894 dated Jun. 20, 2018, 19 pages.

* cited by examiner

FACILITATION OF RANK AND PRECODING MATRIX INDICATION DETERMINATIONS FOR MULTIPLE ANTENNA SYSTEMS WITH APERIODIC CHANNEL STATE INFORMATION REPORTING IN 5G OR OTHER NEXT GENERATION NETWORKS

RELATED APPLICATIONS

The subject patent application is a continuation of, and claims priority to each of, U.S. patent application Ser. No. 16/238,051 (now U.S. Pat. No. 10,491,280), filed Jan. 2, 2019, and entitled "FACILITATION OF RANK AND PRECODING MATRIX INDICATION DETERMINATIONS FOR MULTIPLE ANTENNA SYSTEMS WITH APERIODIC CHANNEL STATE INFORMATION REPORTING IN 5G OR OTHER NEXT GENERATION NETWORKS," which is a continuation of U.S. patent application Ser. No. 15/618,894 (now U.S. Pat. No. 10,187,131), filed Jun. 9, 2017, and entitled "FACILITATION OF RANK AND PRECODING MATRIX INDICATION DETERMINATIONS FOR MULTIPLE ANTENNA SYSTEMS WITH APERIODIC CHANNEL STATE INFORMATION REPORTING IN 5G OR OTHER NEXT GENERATION NETWORKS," the entireties of these applications are hereby expressly incorporated by reference herein.

TECHNICAL FIELD

The subject disclosure relates generally to communications systems, and for example, to facilitation of rank and precoding matrix indication determinations for multiple antennas systems with aperiodic channel state information reporting in 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
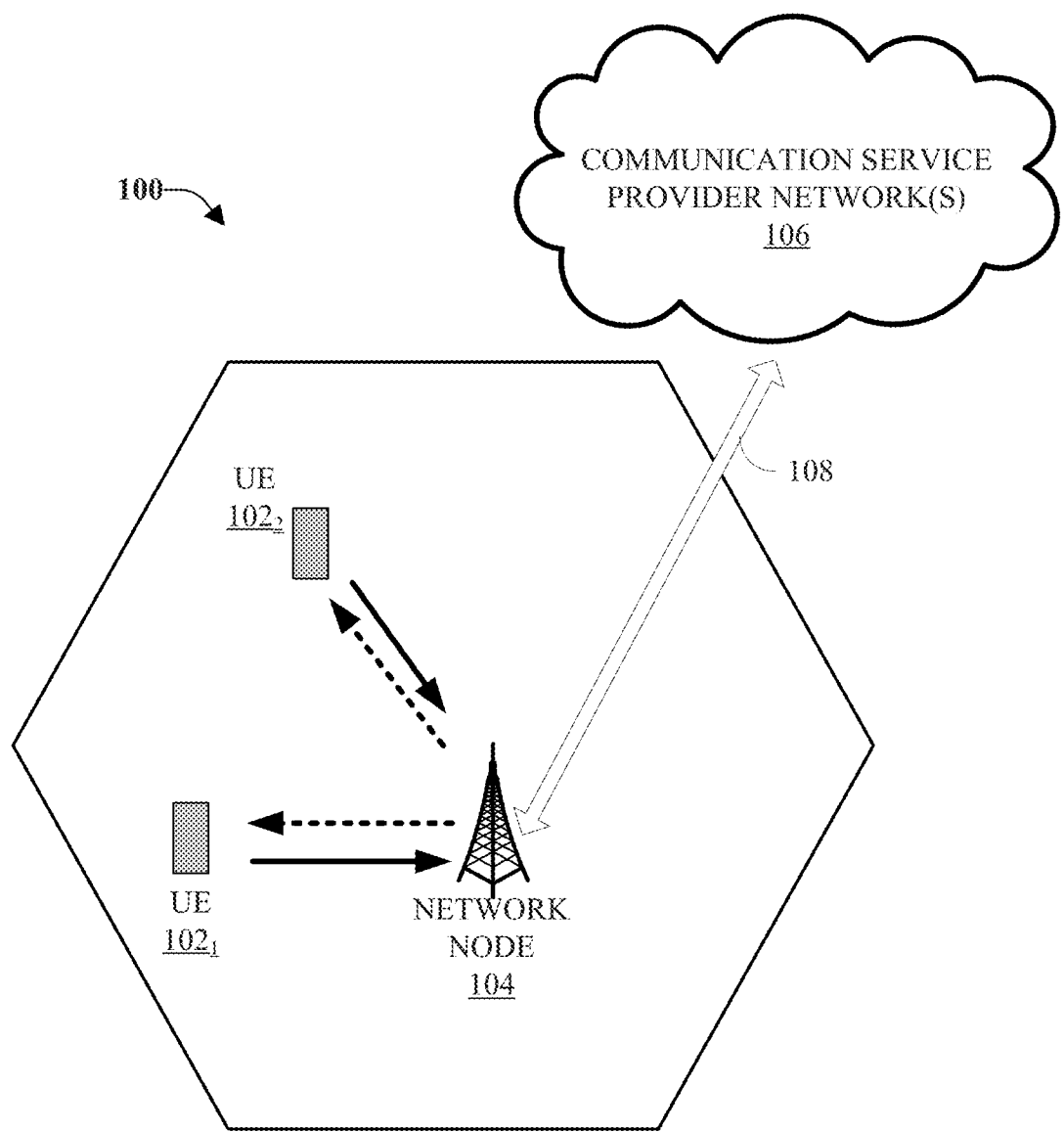
FIG. 1 illustrates an example wireless communication system in which a network node and user equipment can implement various aspects and embodiments of the subject disclosure.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In a multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the previously mentioned reference signals, there are other reference signals, namely multi-cast broadcast single frequency network (MBSFN) and positioning reference signals that can be used for various purposes.

In 5G, a physical downlink control channel (PDCCH) can carry information about a scheduling grants. Typically, the information comprises of number of multiple input and multiple output (MIMO) layers scheduled, transport block sizes, modulation for each codeword, parameters related to hybrid automatic repeat requests (HARQ), and/or sub band locations. However, with DM-RS, there is no need to inform the selected precoding matrix, thereby saving a number of bits in the PDCCH.

Additionally, the uplink control channel can carry information about HARQ acknowledgment (ACK) corresponding to the downlink data transmission and channel state information. The channel state information can comprise rank information (RI), a channel quality indicator (CQI), and a precoding matrix index (PMI).

The various aspects provided herein can reduce complexity at a UE for finding CSI (e.g. rank information and precoding index) for aperiodic reporting. The various aspects use the RI/PMI computed during the periodic reporting which is periodic in nature for reducing the search space in the codebook thereby reducing the number of computations at the UE side.

The disclosed aspects can comprise several advantages comprising: 1) the percentage degradation with respect to full search is zero, while the complexity can be reduced significantly; 2) battery life improvement at the UE; and/or 3) the UE hardware resources (e.g. memory and processing units) can be partly relieved to allow the UE to efficiently execute additional procedures (e.g. inter-Radio Access Technology (RAT) measurements) in parallel with CSI estimation.

As discussed with respect to some embodiments, the non-limiting term radio network node or simply network node is used and refers to any type of network node serving UE and/or connected to other network nodes or network elements or any radio node from where UE receives signals. Examples of radio network nodes are Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) and so on, system.

In some embodiments, the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, iPad, tablet, mobile terminals, smart phone, laptop embedded equipped (LEE), laptop mounted equipment (LME), USB dongles, and so on.

It is noted that although only a 4×4 MIMO system is considered for purposes of this disclosure, the disclosure is applicable for 8 TX, and in general for any Nt≥2 Tx system whereby the PMI and the RI estimation is required. The PMI can be defined as an index within a codebook or the PMI as a precoder itself depending on the context.

The embodiments are described for closed-loop MIMO transmission scheme in NR/LTE based systems. However, the embodiments are applicable to any RAT or multi-RAT system where the UE operates using closed-loop MIMO e.g., HSDPA, Wi-Fi/WLAN, WiMax, CDMA2000, and so forth.

The embodiments are applicable to single carrier as well as to multicarrier (MC) or carrier aggregation (CA) operation of the UE in conjunction with MIMO in which the UE is able to receive and/or transmit data to more than one serving cells using MIMO. The term carrier aggregation (CA) is also called (e.g. interchangeably called) "multi-carrier system," "multi-cell operation", "multi-carrier operation," "multi-carrier" transmission and/or reception.

Ideal linear precoding can comprise full CSI at the transmitter, which can be possible for Time Division Duplex (TDD) based systems but not practical for Frequency Division Duplex (FDD) based systems. Codebook based precoding can allow the receiver to explicitly identify a precoding matrix/vector based on a codebook that should be used for transmission. As an example, in the 3GPP LTE standard, separate codebooks can be defined for various combinations of the number of transmit antennas and the number of transmission layers. The latter is also referred to as rank information (RI). For example, a total of 64 precoding vectors and matrices are defined as shown in Table 1 below for four transmit antennas. Also, for each rank in the codebook for the scenarios of RI=1, 2, 3 and 4, 16 elements per rank are defined.

The 3GPP standard does not specify what criteria the UE should use to compute the RI and/or the optimum precoding matrices/vectors. As mentioned in above, in closed-loop SM, the UE can estimate a suitable CSI, (e.g., CQI/PMI/RI) in order to maximize the throughput and simultaneously maintain the block-error-rate (BLER) constraint which can be mathematically described by a joint (integer) optimization problem, $$\max_{CQI,PMI,RI} \text{Throughput}(CQI, PMI, RI) \quad \text{Equation 1}$$

subject to $BLER \leq$ Threshold.

Unfortunately, the joint (discrete/integer) optimization problem does not have any closed-form solution. Therefore, it can be attempted to estimate a suitable PMI/RI (independent of CQI); thereafter, a suitable CQI is estimated accordingly for the chosen PMI (and RI). For example, consider a single-cell scenario having perfect time and synchronization—a received system model for (closed-loop) SM per sub-carrier (post-FFT) can be shown as, $$Y = \underbrace{R_r^{1/2} H_{IID} R_t^{1/2}}_{H} W_{PMI} x + n \quad \text{Equation 2}$$
$$= H W_{PMI} x + n.$$

where, $Y \in X^{N_r \times 1}$ corresponds to a received signal vector, and $H \in X^{N_r \times N_t}$ describes an overall channel matrix incorporating the receiver and transmitter spatial correlation $R_r \in P^{N_r \times N_r}$ and $R_t \in PP^{N_r \times N_r}$, respectively. A complex zero-mean Gaussian noise vector $n \in C^{N_r \times 1}$ is having covariance $R_n$. An unknown complex data/symbol vector is denoted by $x \in A^{N_L \times 1}$ (having normalized power $E\{xx^H\} = R_x = I$) corresponding to M-QAM (e.g., 64-QAM) constellation $\Pi$. A (complex) precoder $W_{PMI} \in \Pi^{N_r \times N_L}$ is selected from a given/known codebook having $N_\Pi$ number of precoders (where, PMI={0, 1, . . .

TABLE 1

PMI codebook for 4 Tx antennas in LTE

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{1324\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$P_{PMI} = I_4 - \left(\dfrac{2 u_{PMI} u_{PMI}^H}{\|u_{PMI}\|^2}\right)$, the precoding matrix $W_{PMI}$ for different ranks can be obtained by selecting/permuting the appropriate columns of matrix $P_{PMI}$ for the considered PMI.

$N_{TT}-1\}$) for a given rank≤min$\{N_r,N_t\}$. The post-processing SINR per $i^{th}$ spatial layer for a given PMI, assuming linear-MMSE (minimum mean square error) detector employed at the receiver, reads $$SINR_i = \frac{1}{[(W_{PMI}^H H^H R_n^{-1} H W_{PMI} + I_{N_L})^{-1}]_{i,i}} - 1. \quad \text{Equation 3}$$

where $[A]_{i,i}$ corresponds to an $i^{th}$ diagonal element of a matrix A. In order to estimate a suitable PMI/RI, a link-quality metric (LQM), (e.g., mean mutual information, denoted as mMI (per sub-band/wide-band)) is computed, as given below, $$mMI(PMI, RI) = \left(\frac{1}{K \cdot \text{rank}}\right) \sum_{k=1}^{K} \sum_{i=1}^{RI=rank} I(SINR_i[k]). \quad \text{Equation 4}$$

where, I (SINR$_i$[k]) is mutual information that is a function of post-processing SINR$_i$ [k] (and modulation alphabet A) as given in Table 2, below, for $i^{th}$ spatial layer and $k^{th}$ resource-element. The number of resource-elements employed for the computation of the aforementioned LQM is given by a parameter K (depending on the wide-band/sub-band PMI estimate).

TABLE 2

Mutual information for 4-QAM, 16-QAM and 64-QAM.

| Modulation Alphabet A | Mutual Information per symbol |
|---|---|
| 4-QAM | $I(SINR_i) = J(\sqrt{4SINR_i})$ |
| 16-QAM | $I(SINR_i) \approx (1/2)J(0.8818\sqrt{SINR_i}) + (1/4)J(1.6764\sqrt{SINR_i}) + (1/4)J(0.9316\sqrt{SINR_i})$ |
| 64-QAM | $I(SINR_i) \approx (1/3)J(1.1233\sqrt{SINR_i}) + (1/3)J(0.4381\sqrt{SINR_i}) + (1/3)J(0.4765\sqrt{SINR_i})$ |

$$J(a) \approx \begin{cases} -0.04210610\ a^3 + 0.209252\ a^2 - 0.00640081\ a, & 0 < a < 1.6363 \\ 1 - \exp(0.00181491\ a^3 - 0.142675\ a^2 - 0.08220540\ a + 0.0549608), & 1.6363 < a < \infty \end{cases}.$$

After having the estimate of mMI (per sub-band/wide-band), the PMI and RI can be jointly estimated by employing unconstrained optimization which can be given as, $$\max_{PMI,RI} mMI(PMI, RI). \quad \text{Equation 5}$$

In an embodiment, described herein is a method that can comprise determining, by a mobile device comprising a processor, first channel state data of a channel based on a periodic configuration of the mobile device for first transmissions of the first channel state data periodically. The channel can be employed by the mobile device for communications with a network node device of a network. The method can also comprise in response to receiving, from the network node device, reference signal data associated with a reference signal, determining, by the mobile device, second channel state data of the channel based on an aperiodic configuration of the mobile device for second transmissions of the second channel state data aperiodically. The second channel state data can be determined based on selected data from the first channel state data. Further, the method can comprise transmitting, by the mobile device, the aperiodic configuration of the mobile device to the network node device.

According to another embodiment, a system can comprise a processor and a memory that stores executable instructions that, when executed by the processor, facilitate performance of operations. The operations can comprise generating a first report that comprises first channel state data of a channel based on a periodic configuration of a mobile device for first transmissions of the first channel state data periodically. The operations can also comprise in response to receiving, from a network node device of a network, reference signal data associated with a reference signal, generating a second report that comprises second channel state data of the channel based on an aperiodic configuration of the mobile device for second transmissions of the second channel state data aperiodically. The second channel state data can be determined based on selected data from the first channel state data. Further, the operations can comprise sending the aperiodic configuration of the mobile device to the network node device.

According to yet another embodiment, described herein is a machine-readable storage medium, comprising executable instructions that, when executed by a processor, facilitate performance of operations. The operations can comprise determining first channel state data of a channel based on a periodic configuration of a device for first transmissions of the first channel state data periodically. The channel can be employed by the device for communications with a network node device of a network. The operations can also comprise, in response to receiving, from the network node device, reference signal data associated with a reference signal, determining second channel state data of the channel based on an aperiodic configuration of the device for second transmissions of the second channel state data aperiodically. The second channel state data can be determined based on selected data from the first channel state data. Further, the operations can comprise facilitating transmitting an indication of the aperiodic configuration to the network node device.

These and other embodiments or implementations are described in more detail below with reference to the drawings.

FIG. 1 illustrates an example wireless communication system 100 in accordance with various aspects and embodiments of the subject disclosure. In example embodiments, the system 100 is or comprises a wireless communication network serviced by one or more wireless communication network providers. In example embodiments, the system 100 can comprise one or more user equipments (UEs) 102 (e.g., 102$_1$, 102$_2$ . . . 102$_n$), which can comprise one or more antenna panels comprising vertical and horizontal elements.

A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. The UE 102 can also comprise Internet of Thing (IoT) devices that can communicate wirelessly. The UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network node 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In cellular radio access networks (e.g., universal mobile telecommunications system (UMTS) networks), a network node can be referred to as base transceiver stations (BTS), radio base station, radio network nodes, base stations, Node B, eNode B (e.g., evolved Node B), etc.). In 5G terminology, the node can be referred to as a gNode B (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can comprise but are not limited to: Node B devices, base station (BS) devices, access point (AP) devices, and radio access network (RAN) devices. The network node 104 can also comprise multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

The system 100 can further comprise one or more communication service provider networks 106 that can facilitate providing wireless communication services to various UEs, comprising UE 102, via the network node 104 and/or various additional network devices (not shown) included in the one or more communication service provider networks 106. The one or more communication service provider networks 106 can comprise various types of disparate networks, comprising: cellular networks, femto networks, pico-cell networks, microcell networks, internet protocol (IP) networks Wi-Fi service networks, broadband service network, enterprise networks, cloud based networks, and the like. For example, in at least one implementation, the system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation).

In one example, the UE 102 can send a reference signal back to the network node 104. The network node 104 can take a received reference signal from the UE 102, estimate the condition of the channel, which can be influenced by various factors, such as objects in the line of sight, weather, movement, interference, etc., and after correcting for more issues (e.g., interference), can adjust the beamforming rates for each antenna transmitting to the UE 102, and can change parameters, so as to transmit a better beam toward the UE 102. This ability to select MIMO schemes and use beamforming to focus energy and adapt to changing channel conditions can allow for higher data rates.

Figure 2:
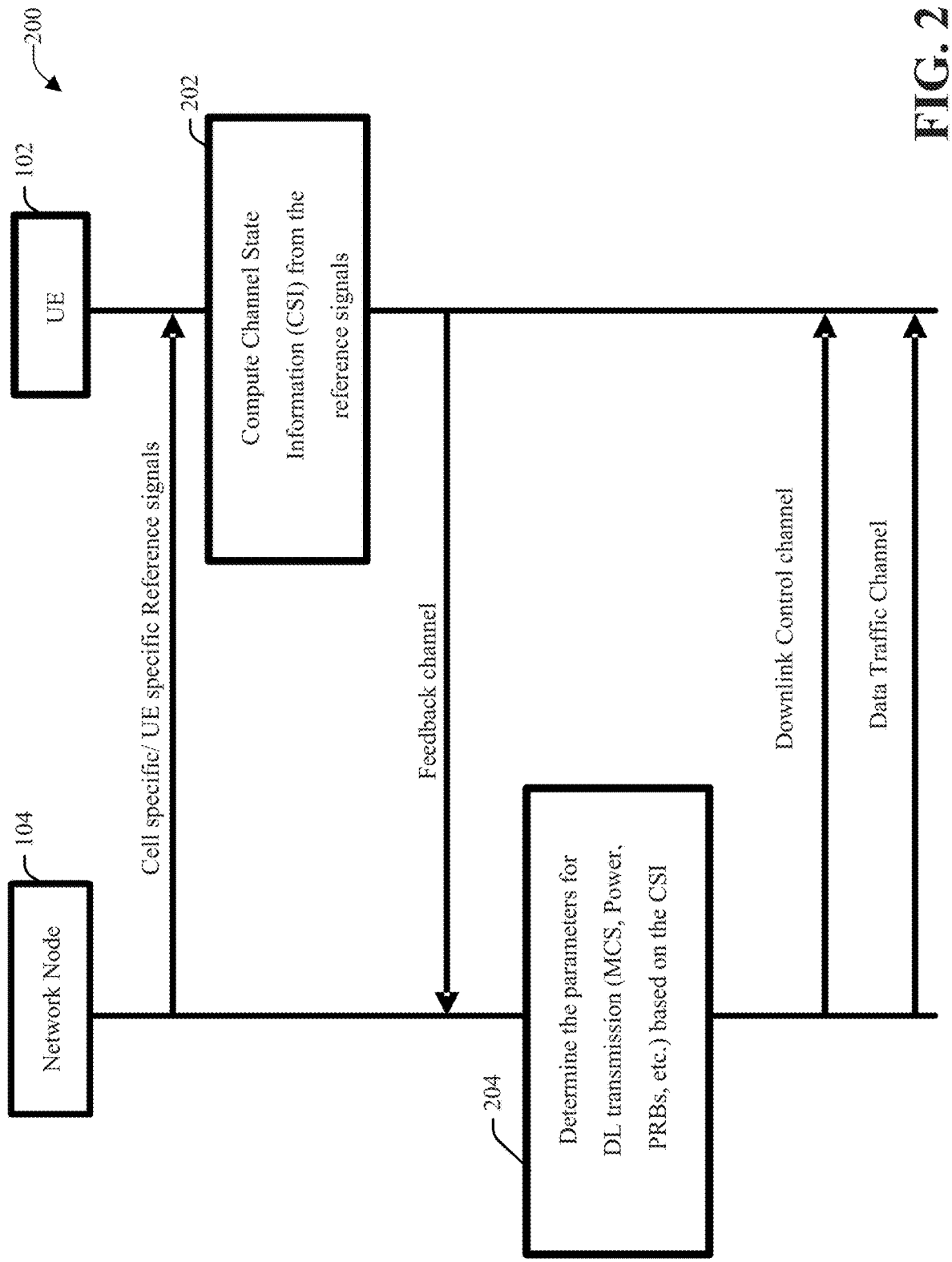
FIG. 2 illustrates an example schematic system block diagram of a message sequence chart between a network node and user equipment according to one or more embodiments.

FIG. 2 illustrates an example schematic system block diagram 200 of a message sequence chart between a network node and user equipment according to one or more embodiments. FIG. 2 depicts a message sequence chart for downlink data transfer in 5G systems. The network node 104 can transmit pilot or reference signals to a user equipment (UE) 102. The reference signals can be cell specific and/or user equipment specific in relation to a profile of the UE 102 or some type of mobile identifier. From the reference signals, the UE 102 can compute channel state information (CSI) and compute parameters used for a CSI report at block 202. The CSI report can comprise: a channel quality indicator (CQI), a pre-coding matrix index (PMI), rank information (RI), a CSI-resource indicator (e.g., CRI the same as beam indicator), and so forth.

The UE 102 can then transmit the CSI report to the network node 104 via a feedback channel either on request from the network node 104, aperiodically, and/or periodically. A network scheduler can leverage the CSI report to determine downlink transmission scheduling parameters at 204, which are particular to the UE 102. The scheduling parameters 204 can comprise modulation and coding schemes (MCS), power, physical resource blocks (PRBs), and so on. The network node 104 can send the scheduling parameters to the UE 102 in the downlink control channel or Physical Downlink Control Channel (PDCCH). FIG. 2 depicts the physical layer signaling where the density change can be reported for the physical layer signaling or as a part of the radio resource control (RRC) signaling. In the physical layer, the density can be adjusted by the network node 104 and then sent over to the UE 102 as a part of the downlink control channel data. The network node 104 can transmit the scheduling parameters, comprising the adjusted densities, to the UE 102 via the downlink control channel. Thereafter and/or simultaneously, data can be transferred, via a data traffic channel, from the network node 104 to the UE 102.

The multiple input multiple output (MIMO), is an advanced antenna technique to improve the spectral efficiency and thereby boosting the overall system capacity. The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). In addition, 3GPP is discussing extending the number of antennas at the base station up to 16/32/64. The configurations represented by (2×1) and (1×2) are special cases of MIMO known as transmit and receive diversity.

MIMO systems can significantly increase the data carrying capacity of wireless systems. MIMO can be used for achieving diversity gain, spatial multiplexing gain and beamforming gain. For these reasons, MIMO is an integral part of the $3^{rd}$ and $4^{th}$ generation wireless systems. In addition, massive MIMO systems are currently under investigation for 5G systems.

Figure 3:
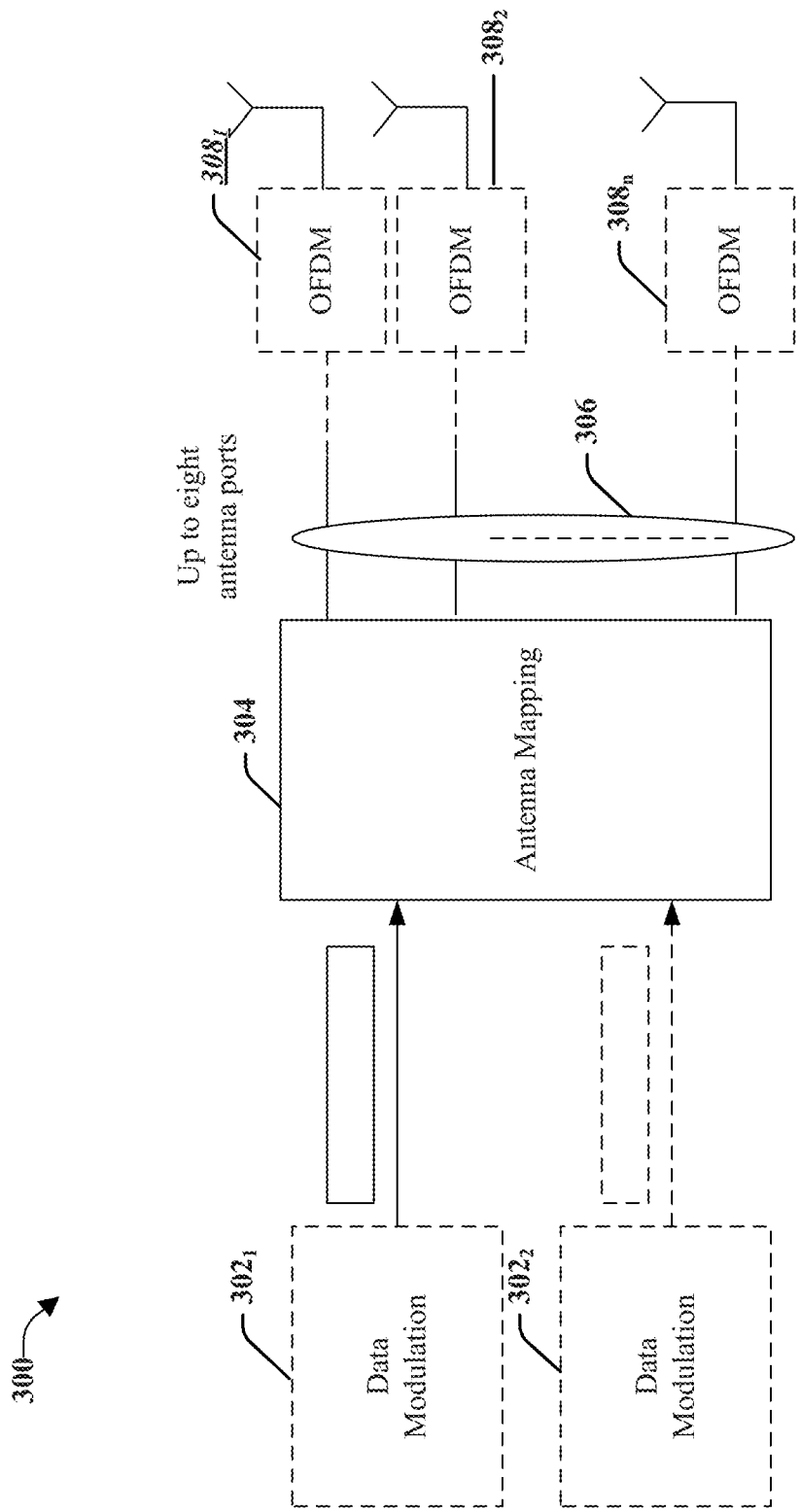
FIG. 3 illustrates an example schematic system block diagram of a 4G multiple input multiple output transmission using up to two code words of encoded data, mapped to up to eight antenna ports according to one or more embodiments.

FIG. 3 illustrates an example schematic system block diagram 300 of a 4G MIMO transmission using up to two code words of encoded data, mapped to up to eight antenna ports according to one or more embodiments. A similar structure can be used for 5G systems with more antenna ports. Antenna mapping 304 in general, can be described as a mapping from the output of a data modulation $302_1$, $302_2$ to the different antenna ports 306. The input to the antenna mapping 304 can comprise modulation symbols (QPSK, 16QAM, 64QAM, 256QAM) corresponding to the one or two transport blocks. To be more specific, there can be one transport block per transmit time interval (TTI) except for spatial multiplexing, in which case there can be up to two transport blocks per TTI. The output of the antenna mapping can be a set of symbols for each antenna port. The symbols of each antenna port can be subsequently applied to the OFDM modulator $308_1$, $308_2$ . . . $308_n$ (e.g., mapped to the basic OFDM time-frequency grid corresponding to that antenna port).

Figure 4:
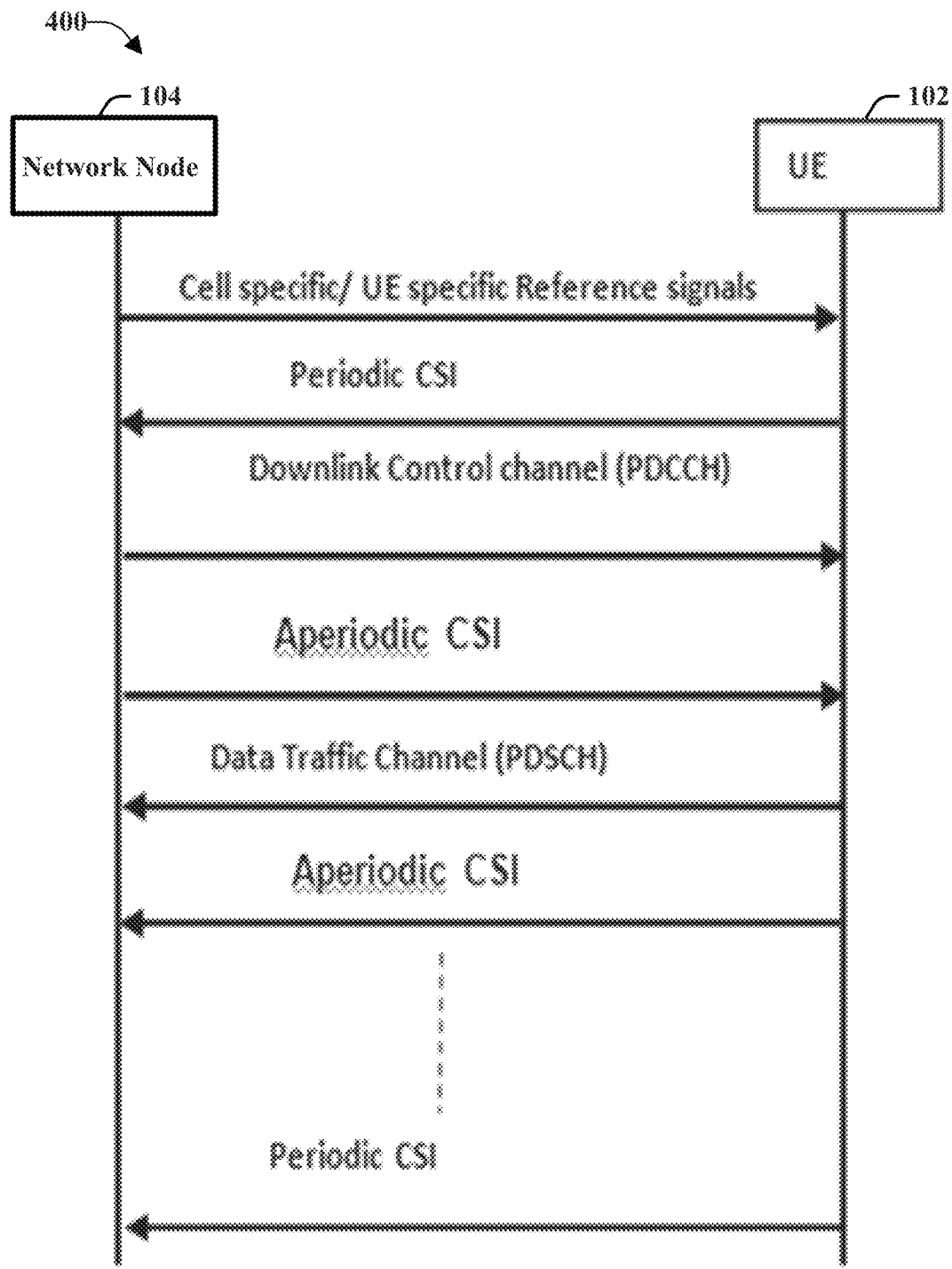
FIG. 4 illustrates an example schematic system block diagram of a message sequence chart between the network and the user equipment with periodic and aperiodic channel state information according to one or more embodiments.

FIG. 4 illustrates n example schematic system block diagram 400 of a message sequence chart between the network (e.g., gNode B) and the UE with periodic and aperiodic CSI according to one or more embodiments. The network node 104 can configure the UE 102 to send CSI either periodically or on an on demand (aperiodic) basis. It can be beneficial to configure the UE with both types of CSI reporting for whole band or sub band. As previously discussed, FIG. 2 depicted a message sequence chart for downlink data transfer in a NR closed loop system. From the pilot or reference signals, the UE can compute the channel estimates and compute the parameters used for CSI reporting. The CSI report can comprise a channel quality indicator (CQI), a precoding matrix index (PMI), rank information (RI), etc. Thus, the periodic CSI report can comprise CSI computed over the whole bandwidth, which may not represent a sub band CSI. Consequently, the network node 104 can demand sub band CSI via a downlink control channel. In this case, the UE 102 can report the CSI aperiodically using one or more embodiments described herein. Once the network node 104 receives this information, it can schedule the UE 103 with either sub band scheduling or with wideband scheduling.

Figure 5:
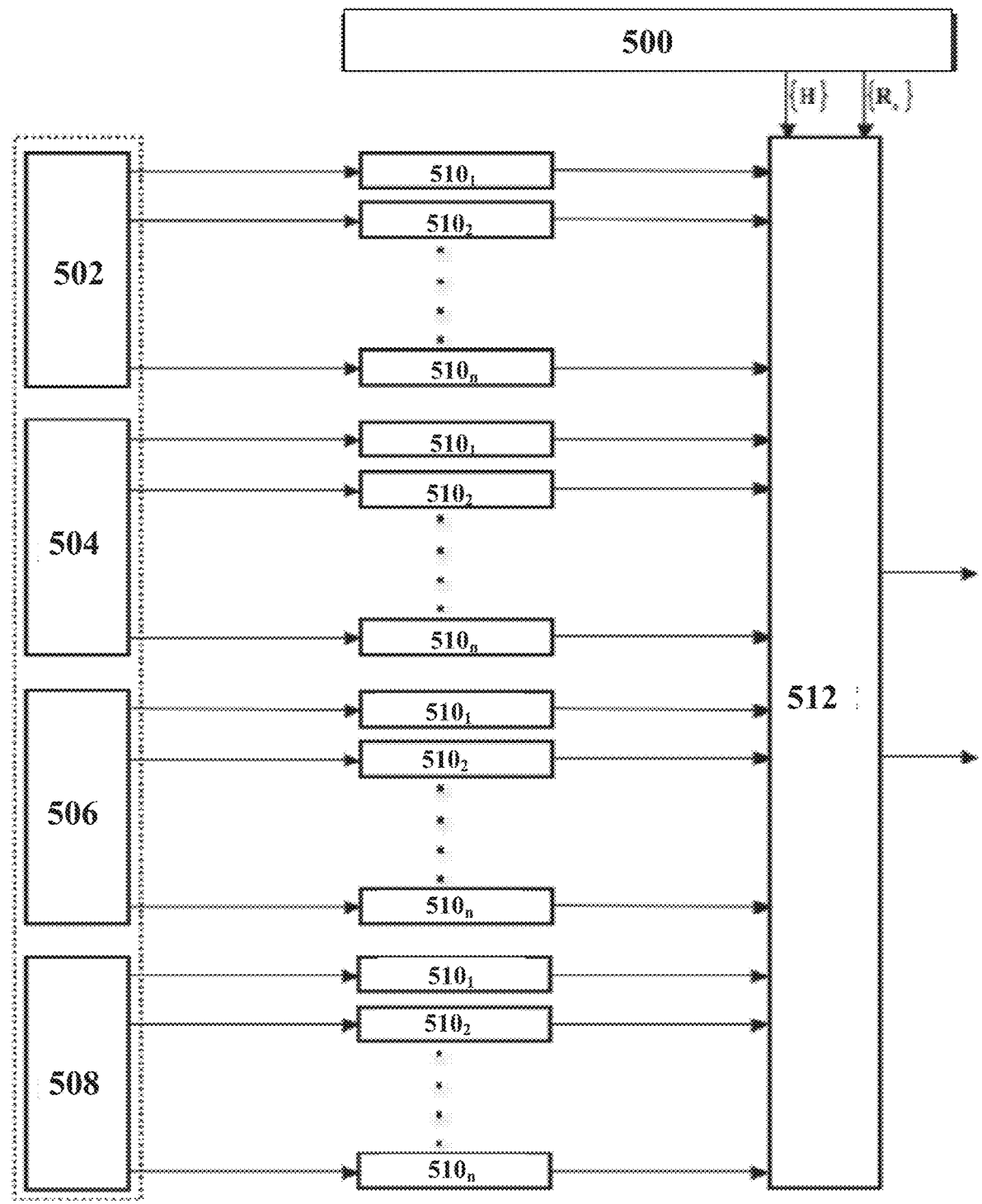
FIG. 5 illustrates an example schematic system block diagram of an exhaustive precoding matrix index and rank information search for 4×4 multiple input multiple output in LTE/LTE-A systems according to one or more embodiments.

FIG. 5 illustrates an example schematic system block diagram of an exhaustive PMI and RI search for 4×4 MIMO in LTE/LTE-A systems according to one or more embodiments. FIG. 5 depicts how the PMI and RI are computed based on the mutual information approach. Thus, with the chosen PMI/RI, the CQI can be computed afterwards. For example rank hypothesis 502, 504, 506, 508 can be sent to several corresponding PMI hypothesis $510_1$, $510_2$ . . . $510_n$. Thereafter, data from the corresponding PMI hypothesis $510_1$, $510_2$ . . . $510_n$ can be sent and received by block 512. Block 512 can also receive channel estimates, noise covariance estimates and other channel parameters from block 500, whereby block 512 can generate joint PMI and RI estimations. Thereafter, a PMI estimate and a RI estimate can be output by block 512.

Figure 6:
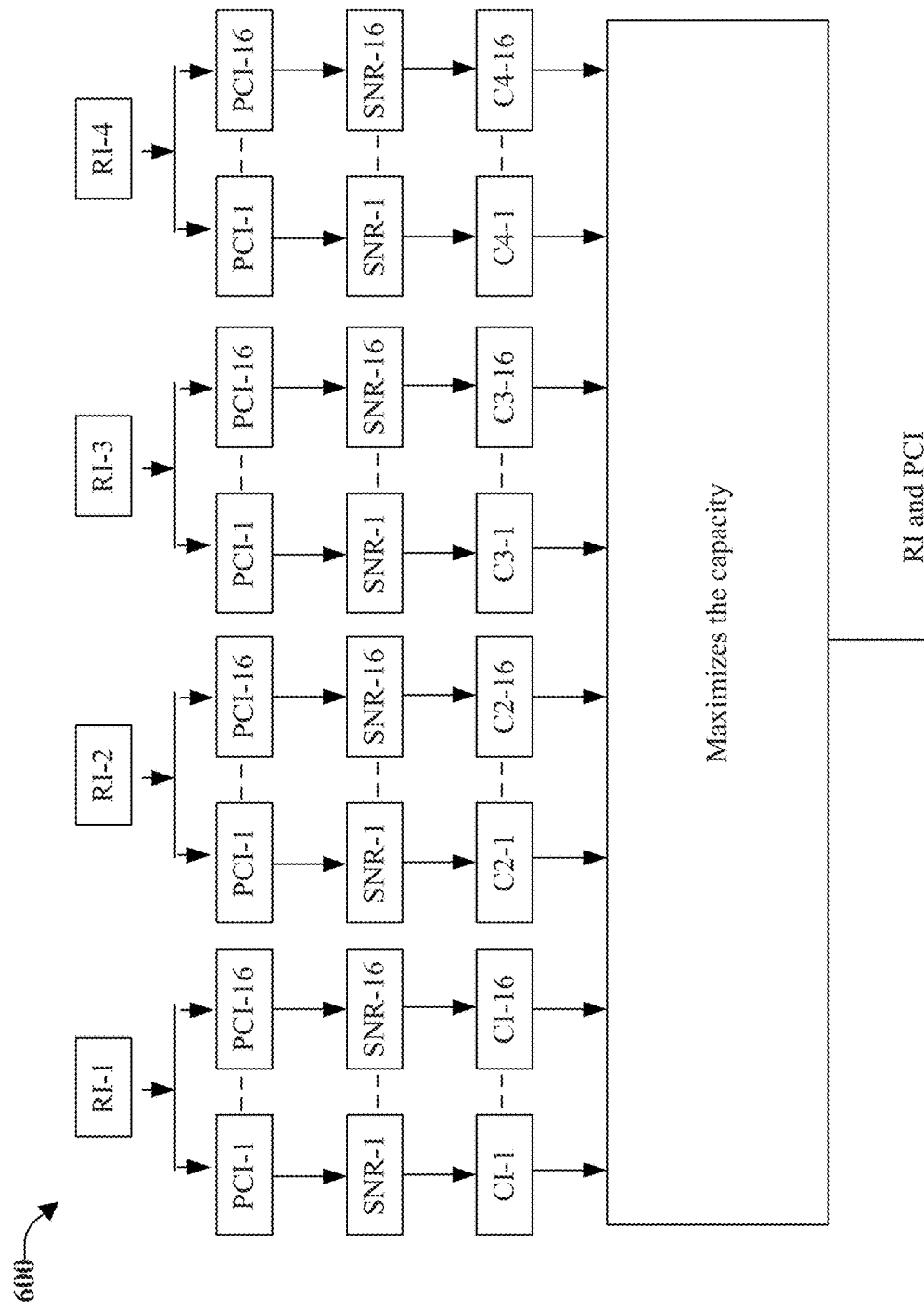
FIG. 6 illustrates an example schematic system block diagram of a pictorial view of precoding matrix index and rank information selection in a conventional selection system using a capacity approach according to one or more embodiments.

FIG. 6 illustrates an example schematic system block diagram of an example pictorial view of PMI/RI selection during conventional selection using a capacity approach according to one or more embodiments. The pictorial view is for finding RI and PMI for a 4 transmit antenna system using capacity approach for 4 Tx antenna system. Leveraging the capacity approach can yield RI and PMI for a 4 transmit antenna system 600. Thus, the received SINR at the output of the MIMO detector (MMSE, MLD, etc.) is a function of the channel matrix H, precoding matrix, the noise power spectral density and the co-channel interference power. For example, the UE 102 can estimate the channel via signal data and/or pilot data. The UE 102 can then compute the post-processing SINR for each entity in the precoding codebook. Furthermore, the UE 102 can compute the LQMs via either the capacity approach or mutual-information approach for each entity using the aforementioned Equation 4 above or Equation 6 below.

$$\text{capacity}(PMI, RI) = \left(\frac{1}{K \cdot rank}\right) \sum_{k=1}^{K} \sum_{i=1}^{RI=rank} \log_2(1 + SINR_i[k]). \quad \text{Equation 6}$$

Consequently, the precoding control index and the corresponding RI can be determined, and use to maximize the LQM.

With periodic and aperiodic CSI reporting, the UE needs to compute RI an excessive number of times. Finding PMI/RI with an increased number of antennas is highly complex and an exhaustive search over codebook elements is necessary. However, the exhaustive search involves many computations and is almost impossible to implement with the increase in the number of transmit antennas.

For example in 4 Tx MIMO, the UE needs to search 64 precoding entities for finding the rank information and precoding index. This may drain UE battery life or increase power consumption, consume more memory and processing units at the UE. This is because with the increase of number of antennas, the codebook size grows. Hence, with the currently available hardware/software resources within a limited time budget finding rank information and the corresponding precoding matrix computation is highly complex.

Rank information is a second order statistic of the channel and does not change fast unlike precoding matrix or CQI. As example, the value of rank reported by the UE was plotted for 100 CSI reports for various geometries (long term signal to noise ratios) and found that rank reported by the UE is general constant or changes by either +1 or −1 for various speeds. This same trend is observed for medium Doppler (60 Km/h for 2.1 GHz carrier frequency). FIGS. 7-14 illustrate the instantaneous rank reported by the UE for geometry or long term SINR equal to −5, 0, 5, 10, 15, 20, 25, and 30 dB. In all these cases, it was observed that rank information does not change drastically, means rank information does not go from 1 to 4 or 1 to 3, rather it changes slowly more specifically goes from 1 to 2 or 2 to 1 or 2 to 3 or 3 to 4 and vice versa (based on geometry).

Specifically, it was observed that rank information does not change drastically. Instead, rank information changes in steps of +1 or −1 for most range of Doppler frequencies (UE speeds). Therefore, rank and the PMI reported for periodic reporting can be used as the input when finding the RI/PMI during aperiodic reporting.

Figure 7:
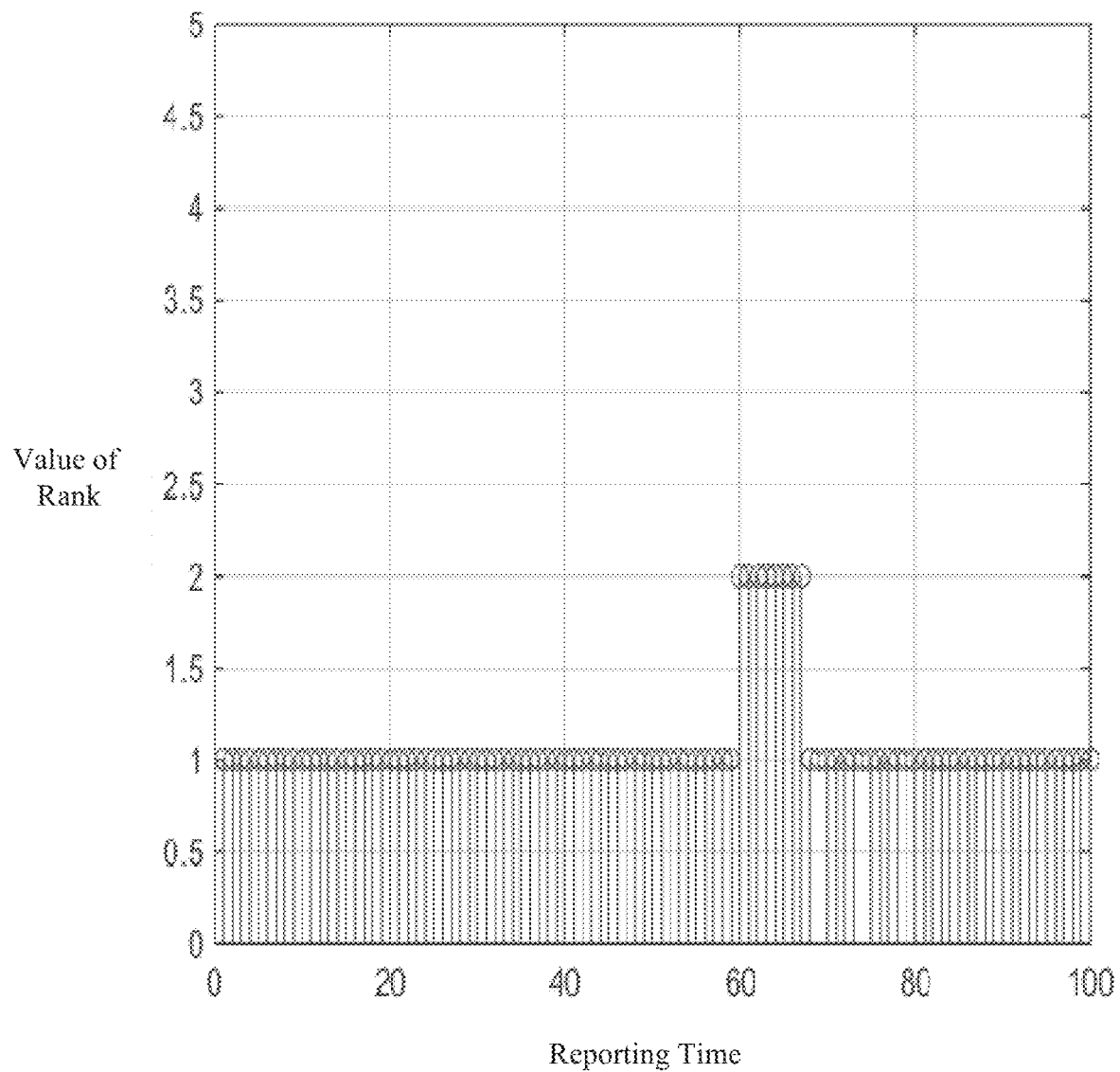
FIG. 7 illustrates an example graph of an instantaneous rank information at geometry equal to −5 dB according to one or more embodiments.
Figure 8:
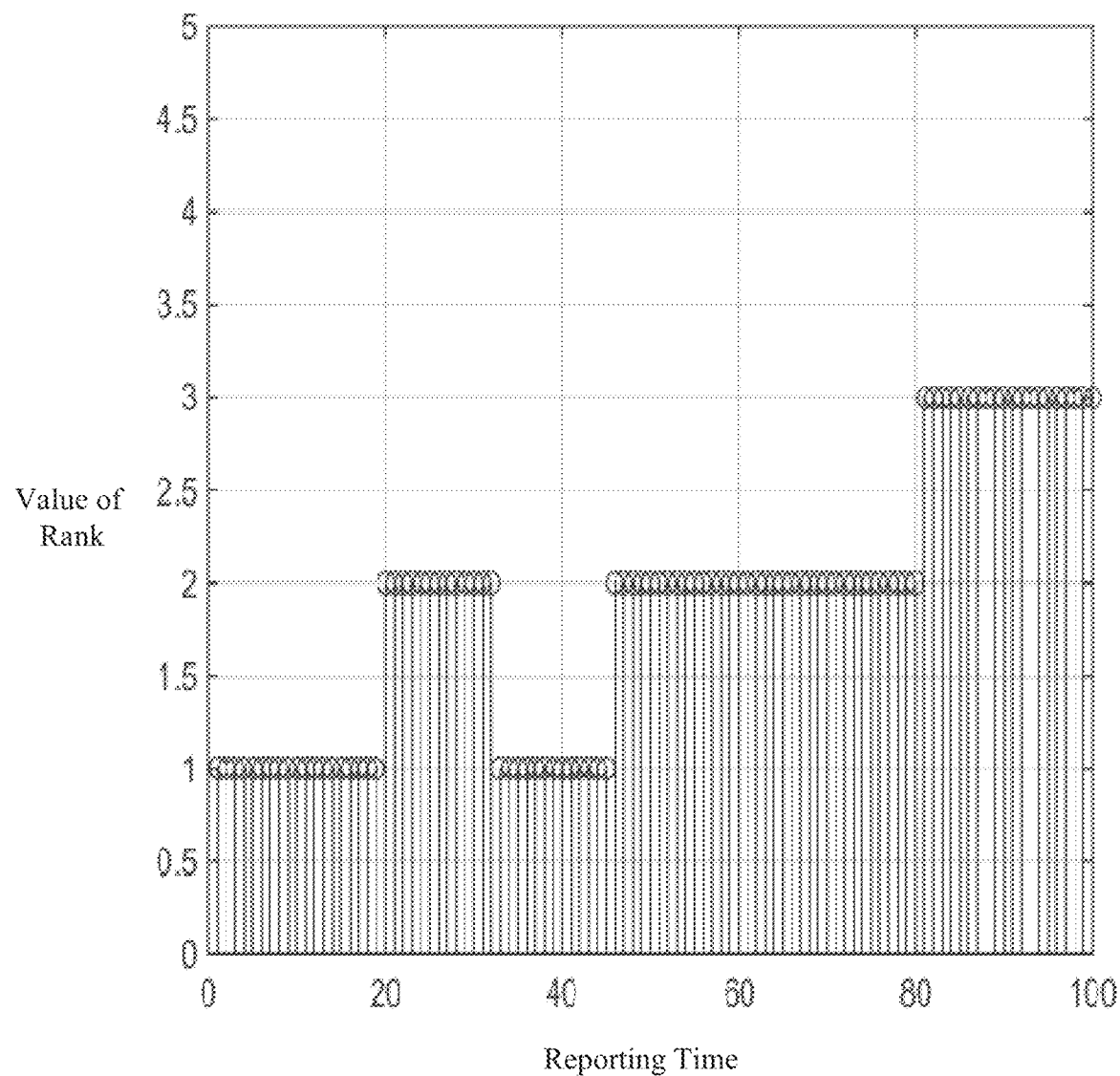
FIG. 8 illustrates an example graph of an instantaneous rank information at geometry equal to 0 dB according to one or more embodiments.
Figure 9:
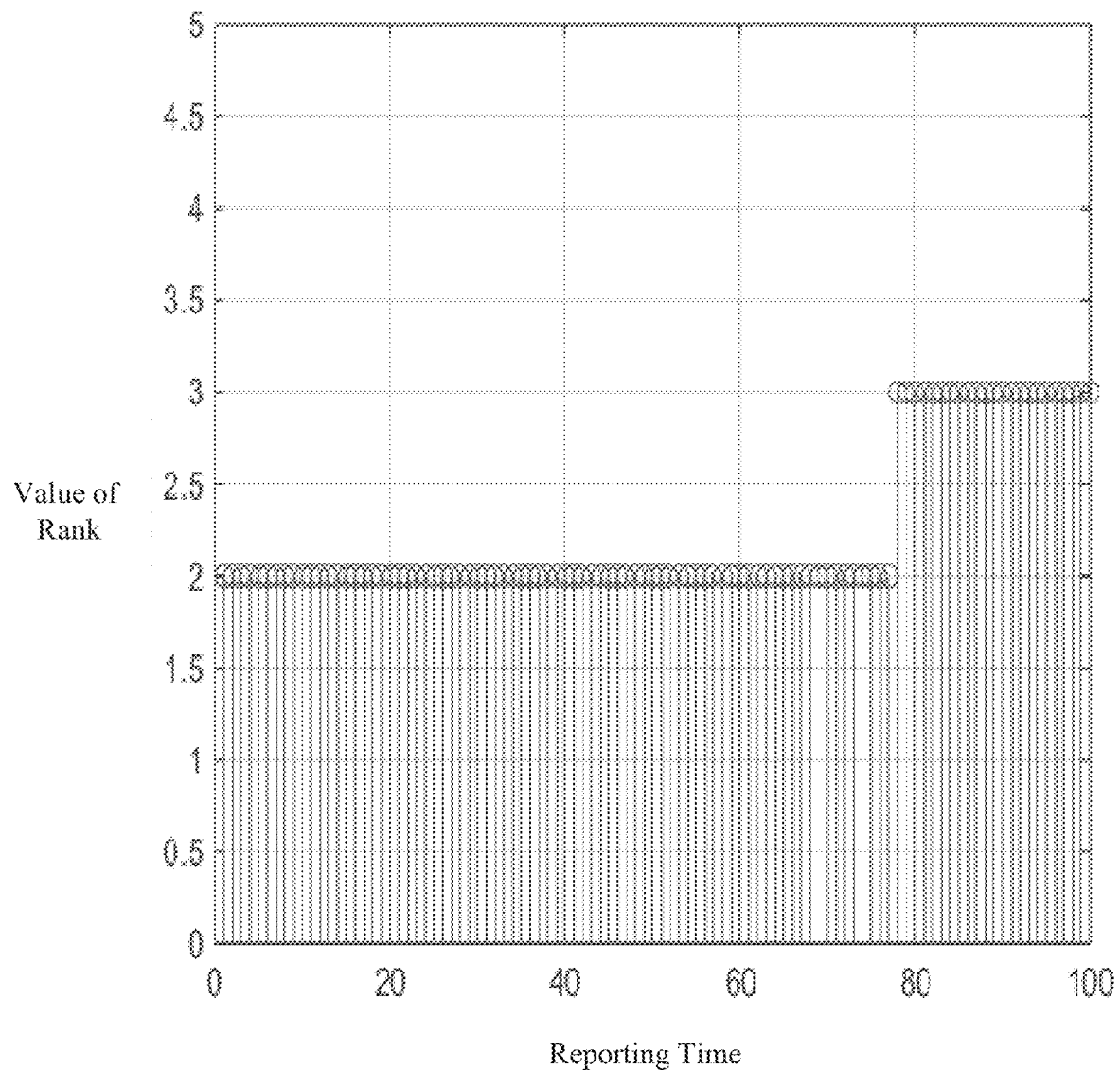
FIG. 9 illustrates an example graph of an instantaneous rank information at geometry equal to 5 dB according to one or more embodiments.
Figure 10:
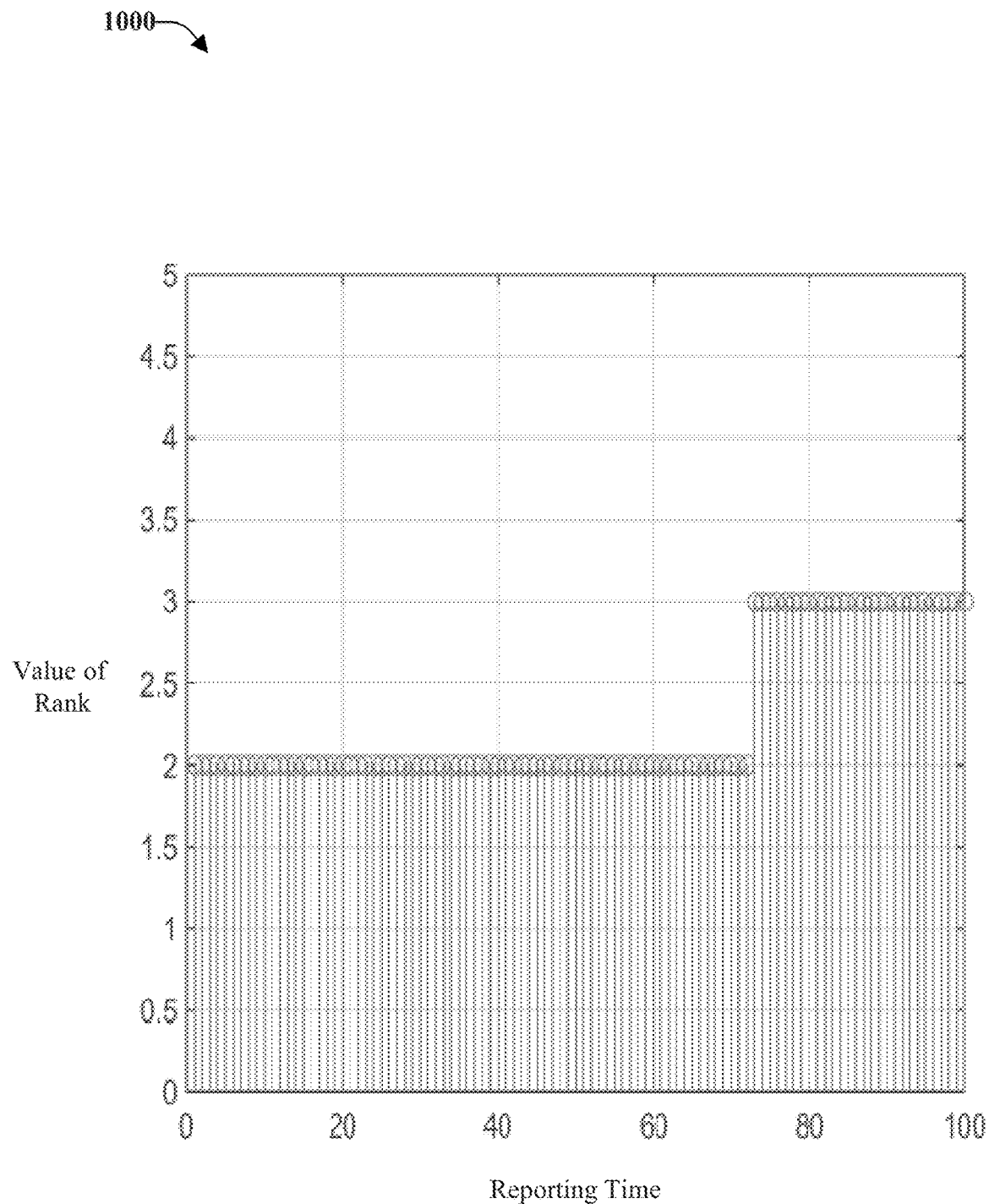
FIG. 10 illustrates an example graph of an instantaneous rank information at geometry equal to 10 dB according to one or more embodiments.
Figure 11:
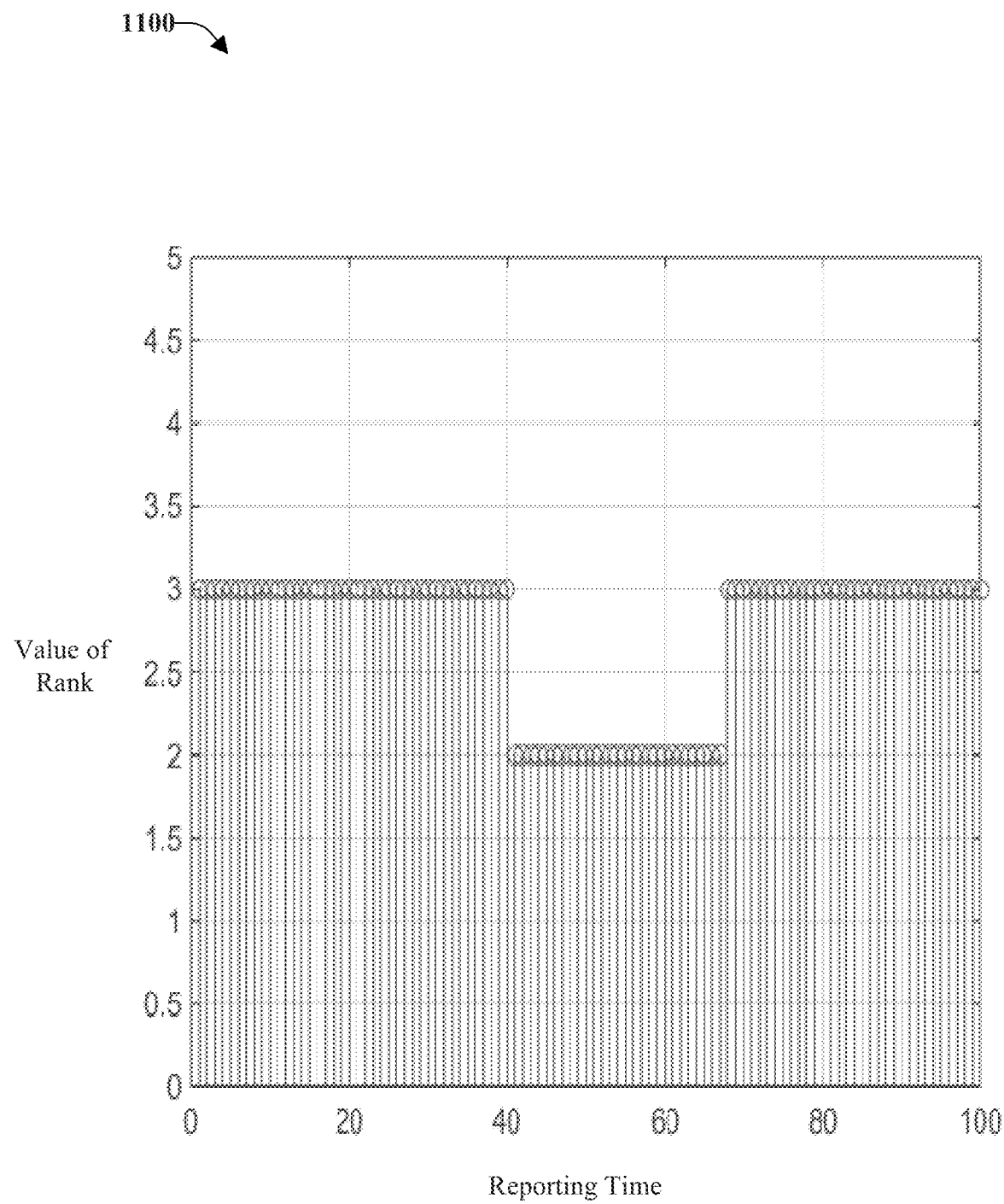
FIG. 11 illustrates an example graph of an instantaneous rank information at geometry equal to 15 dB according to one or more embodiments.
Figure 12:
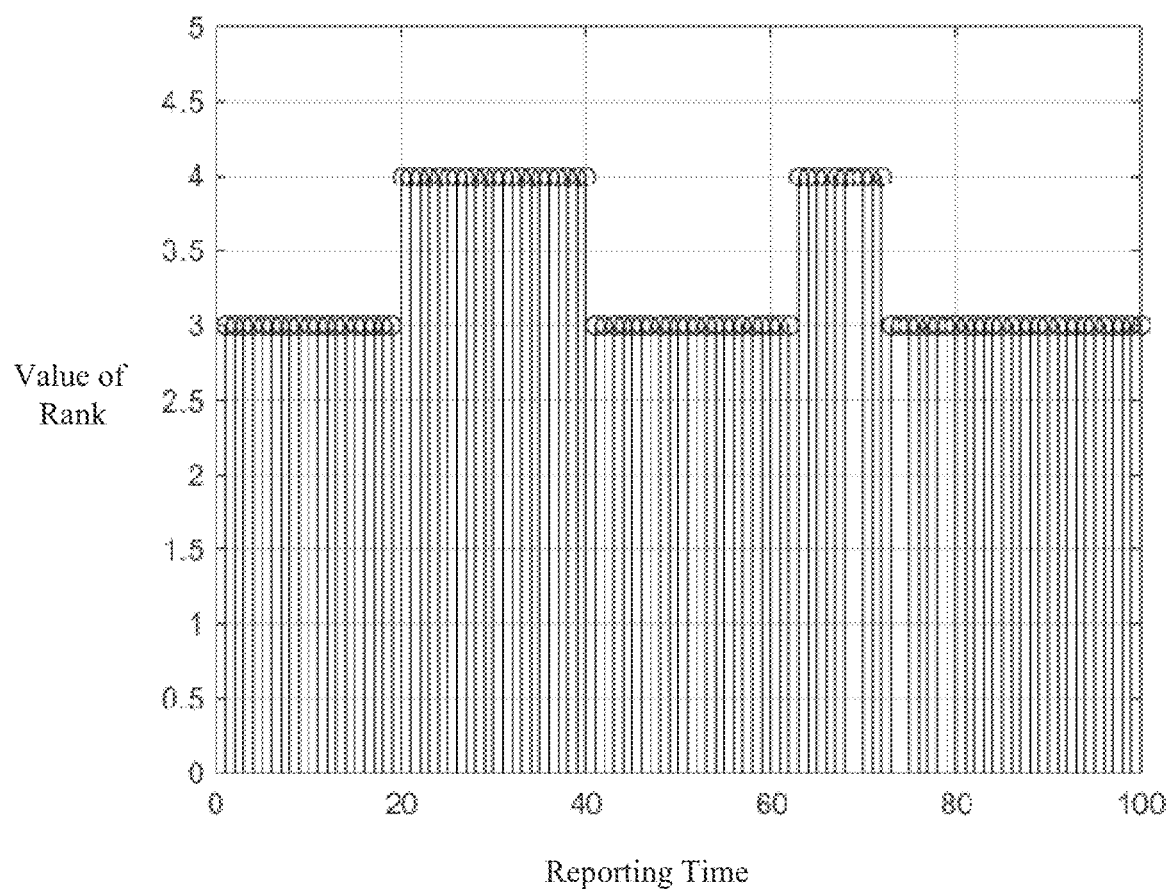
FIG. 12 illustrates an example graph of an instantaneous rank information at geometry equal to 20 dB according to one or more embodiments.
Figure 13:
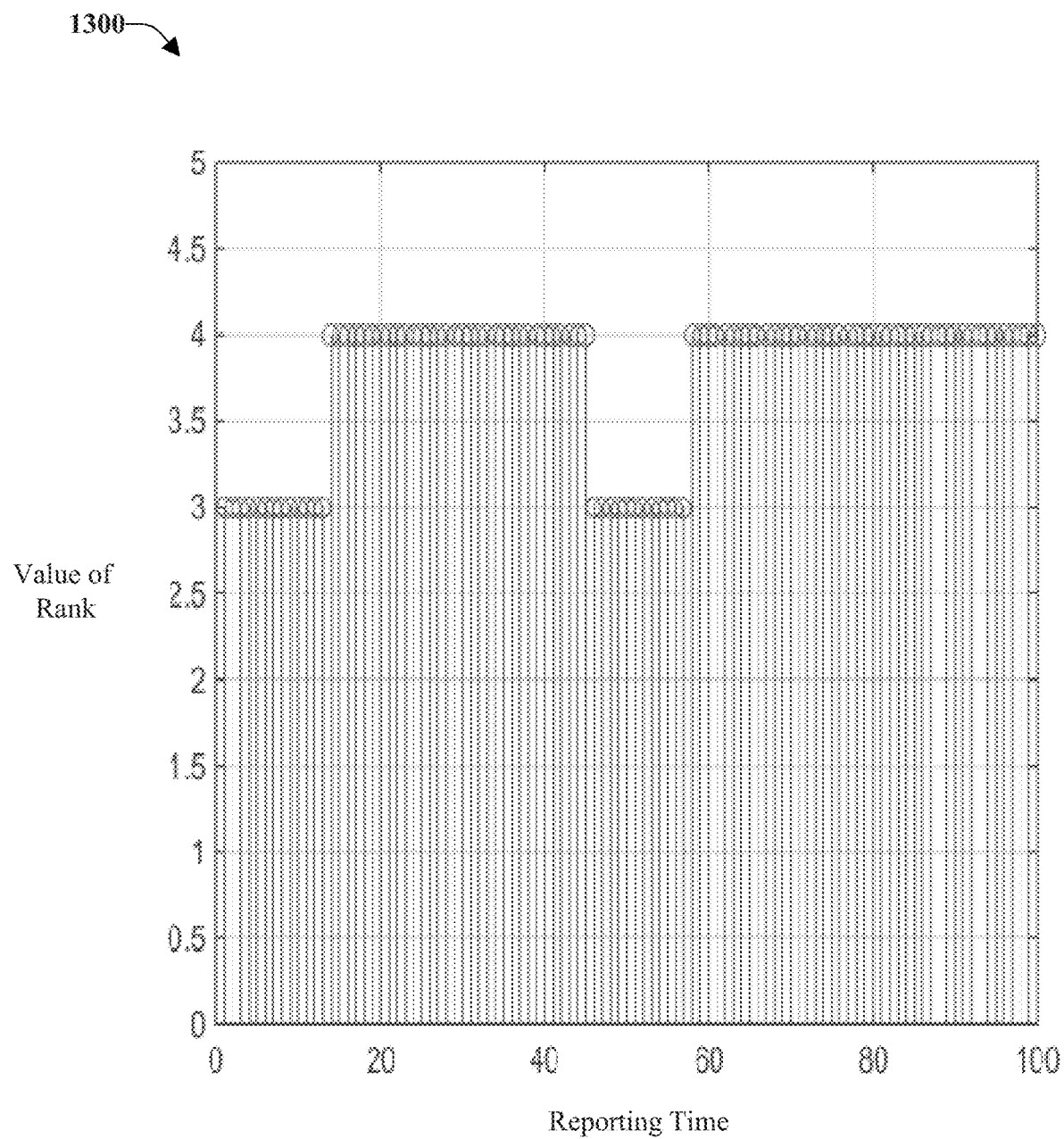
FIG. 13 illustrates an example graph of an instantaneous rank information at geometry equal to 25 dB according to one or more embodiments.
Figure 14:
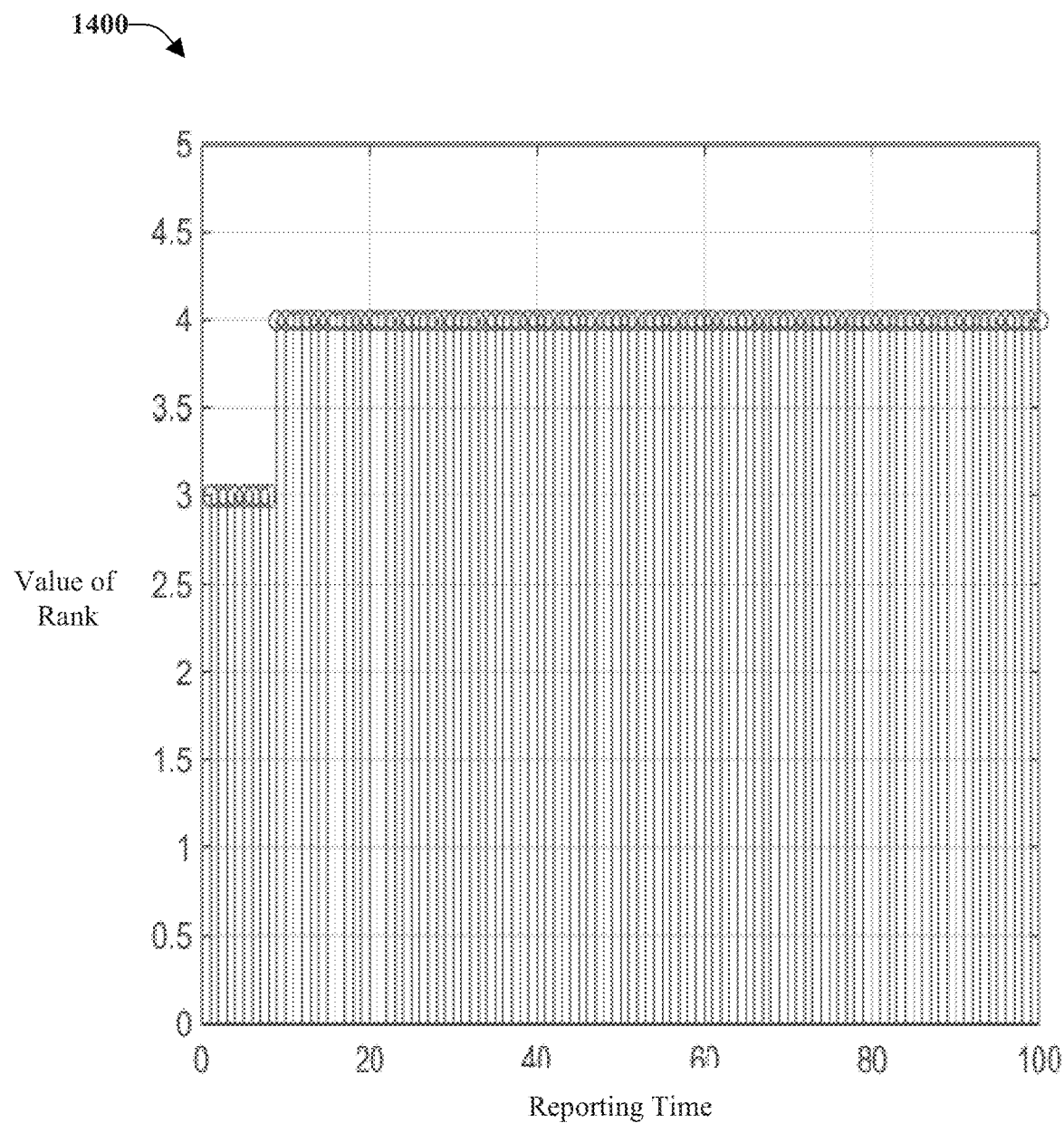
FIG. 14 illustrates an example graph of an instantaneous rank information at geometry equal to 30 dB according to one or more embodiments.

Referring now to FIGS. 7-14, illustrated are example graphs of an instantaneous RI at various geometries between −5 dB to 30 dB (in increments of 5 dB) according to one or more embodiments. More specifically, graph 700 of FIG. 7 illustrates instantaneous RI at geometry equal to −5 dB; graph 800 of FIG. 8 depicts instantaneous RI at geometry equal to 0 dB; graph 900 of FIG. 9 illustrates instantaneous RI at geometry equal to 5 dB, graph 1000 of FIG. 10 depicts instantaneous RI at geometry equal to 10 dB, graph 1100 of FIG. 11 depicts instantaneous RI at geometry equal to 15 dB, graph 1200 of FIG. 12 illustrates instantaneous RI at geometry equal to 20 dB, graph 1300 of FIG. 13 depicts instantaneous RI at geometry equal to 25 dB, and graph 1400 of FIG. 14 depicts instantaneous RI at geometry equal to 30 dB.

Figure 15:
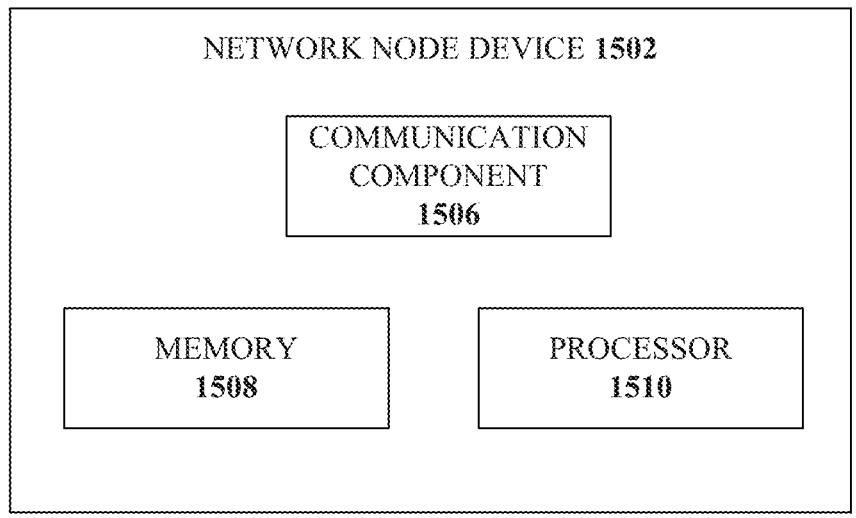
FIG. 15 illustrates an example, non-limiting, communications system for facilitating rank and precoding matrix indication determinations in multi-antenna systems with aperiodic channel state information reporting in accordance with one or more embodiments described herein.
Figure 15:
Figure 15:
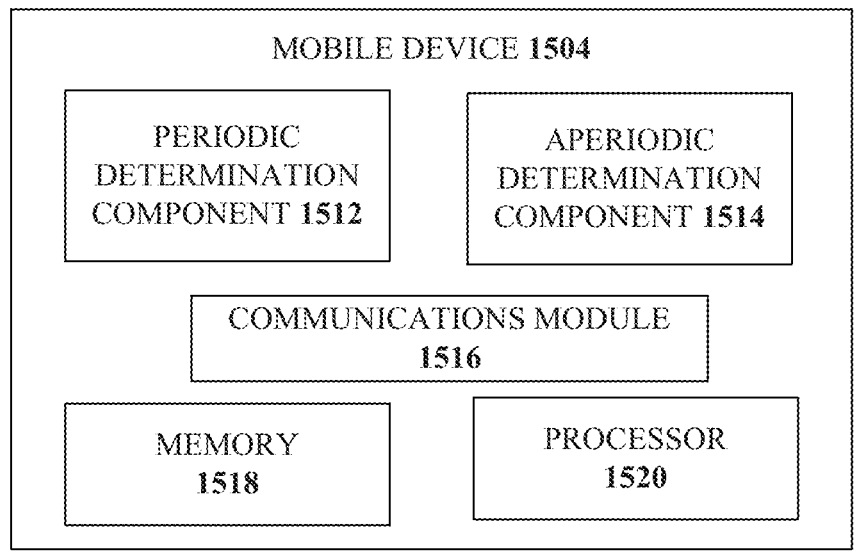

FIG. 15 illustrates an example, non-limiting, communications system 1500 for facilitating rank and precoding matrix indication determinations in multi-antenna systems with aperiodic channel state information reporting in accordance with one or more embodiments described herein.

The communications system 1500 can comprise one or more network devices (illustrated as a network node device 1502) and one or more mobile devices (illustrated as a mobile device 1504). The network node device 1502 can be included in a group of network devices of a wireless network. Although only a single mobile device and a single network device are illustrated, the communications system 1500 can comprise a multitude of mobile devices and/or a multitude of network devices.

The network node device 1502 can comprise a communications component 1506, at least one memory 1508, and at least one processor 1510. Further, the mobile device 1504 can comprise a periodic determination component 1512, an aperiodic determination component 1514, a communications module 1516, at least one memory 1518, and at least one processor 1520. The network node device 1502, through the communications component 1506, can communicate with the mobile device 1504, through the communications module 1516. For example, the network node device 1502 can communicate reference signal data associated with a reference signal with the mobile device 1504.

The periodic determination component 1512 can determine first channel state data of a channel based on a periodic configuration of the mobile device 1504 for first transmissions of the first channel state data periodically. The channel can be employed by the mobile device for communications with a network node device of a network. The periodic configuration of the mobile device for the first transmissions can comprise rank information and a precoding index.

According to an implementation, the first channel state data can comprise precoding matrix index data associated with a precoding matrix of the channel employed by the mobile device. According to another implementation, the first channel state data can comprise precoding matrix index data associated with multiple precoding matrices associated with sub bands of the channel employed by the mobile device. In yet another implementation, the first channel state data can comprise rank data associated with a channel rank of the channel employed by the mobile device.

Based on the received reference signal data associated with a reference signal, the aperiodic determination component 1514 can determine second channel state data of the channel based on an aperiodic configuration of the mobile device for second transmissions of the second channel state data aperiodically. The aperiodic determination component 1514 can determine the aperiodic configuration based on a defined range associated with the rank information and the precoding index. The defined range can comprise a reported rank of the periodic configuration, a first rank that is the reported rank plus one rank, and a second rank that is the reported rank minus one rank.

According to some implementations, the aperiodic determination component 1514 can determine the second channel state data by reducing a search space in a codebook as compared to performing an exhaustive search over the search space in the codebook (e.g., as performed by the periodic determination component 1512). According to some implementations, the aperiodic determination component 1514 can reduce the search space in the codebook by reducing a number of computations performed by the mobile device 1504 to search the search space. This can result in a reduced number of computations. The reduced number of computations can be relative to the number of computations performed by the mobile device 1504 for aperiodic reporting related to the exhaustive search performed for periodic reporting.

The second channel state data can be determined by the aperiodic determination component 1514 based on selected data from the first channel state data. The communications module 1516 can transmit the aperiodic configuration of the mobile device 1504 to the network node device 1502.

The communications component 1506 and/or the communications module 1516 can be a transmitter/receiver configured to transmit to and/or receive data from the network node device 1502, the mobile device 1504, other network devices, and/or other mobile devices. Through the communications component 1506, the network node device 1502 can concurrently transmit and receive data, can transmit and receive data at different times, or combinations thereof. In a similar manner, through the communications module 1516, the mobile device 1504 can concurrently transmit and receive data, can transmit and receive data at different times, or combinations thereof.

The respective one or more memories 1508, 1518 can be operatively coupled to the respective one or more processors 1510, 1520. The respective one or more memories 1508, 1518 can store protocols associated with facilitation of rank and precoding matrix indication determinations for multiple antennas systems with aperiodic channel state information reporting as discussed herein. Further, the respective one or more memories 1508, 1518 can facilitate action to control communication between the network node device 1502 and the mobile device 1504, such that the system 1500 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 1510, 1520 can facilitate respective analysis of information related to facilitation of rank and precoding matrix indication determinations for multiple antennas systems with aperiodic channel state information reporting in a communication network. The processors 1510, 1520 can be processors dedicated to analyzing and/or generating information received, processors that control one or more components of the system 1500, and/or processors that both analyze and generate information received and control one or more components of the system 1500.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes (e.g., network device 302) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 16:
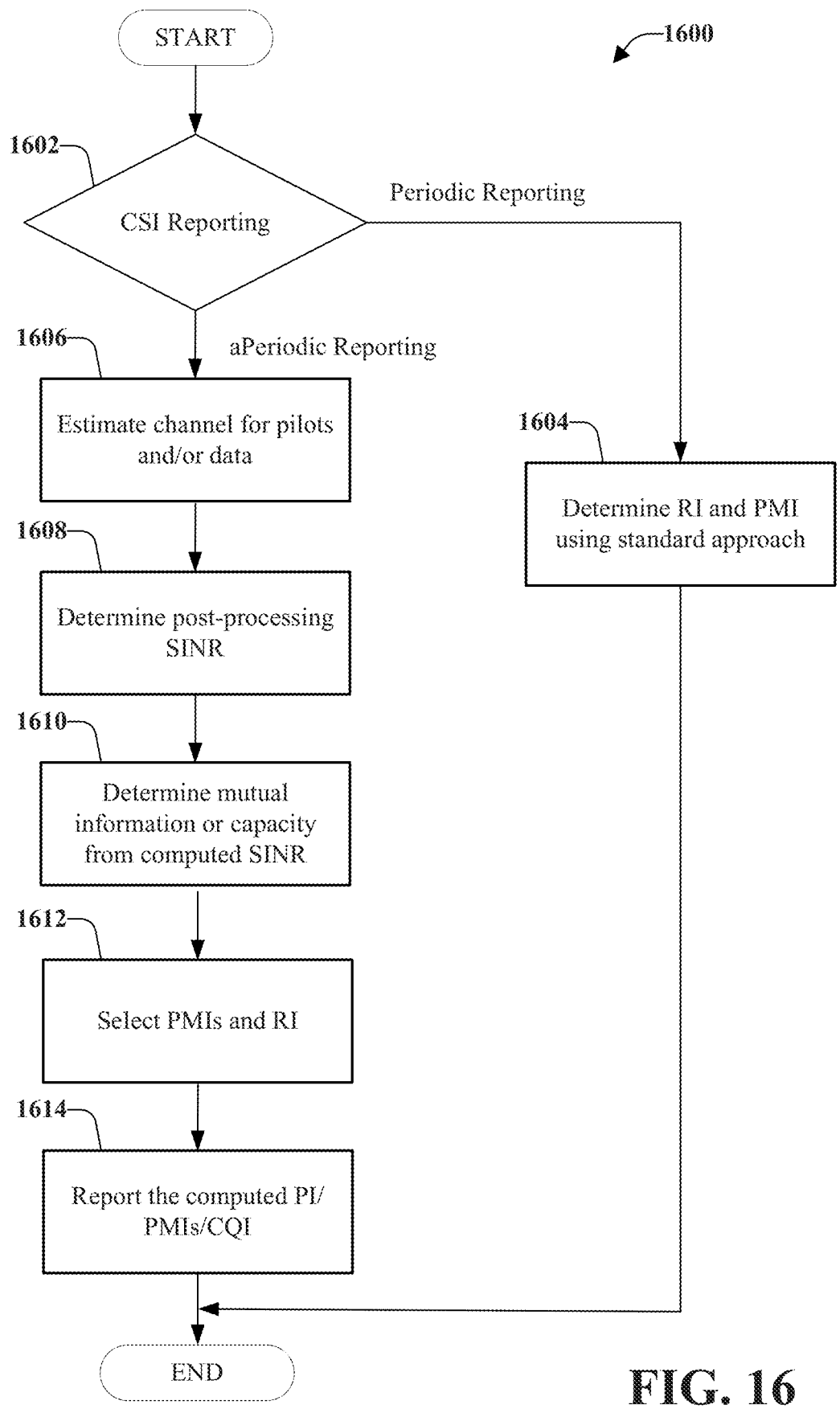
FIG. 16 illustrates an example, non-limiting, method for facilitating reduction of a complexity to determine rank information and precoding matrix index in accordance with one or more embodiments described herein.

FIG. 16 illustrates an example, non-limiting, method 1600 for facilitating reduction of a complexity to determine rank information and precoding matrix index in accordance with one or more embodiments described herein. At 1602 is a determination is made whether the type of reporting is periodic reporting or aperiodic reporting. If periodic reporting, at 1604, the RI and PMI can be determined using a traditional approach. For example, the traditional approach is an exhaustive search over codebook elements and involves many computations.

However, according to the various aspects provided herein, if the determination at 1602 is that the type of reporting is aperiodic reporting, computational complexity can be reduced. Therefore, at 1606, the MIMO receiver (e.g., the UE) can estimate the channel from known pilots and/or from known data. The post-processing SINR can be computed, at 1608. This determination can be based on the parent PMIs from the previously reported rank on periodic reporting, previously reported rank on periodic reporting +1, and previously reported rank on periodic reporting −1.

At 1610, the mutual information or capacity can be determined from the determined SINR. Further, at 1612, the PMIs and RI can be selected. The selection can be based on all the hypotheses that maximizes either the mutual information and capacity, and the best determined PMIs and RI for the available PMIs and RIs can be selected. The computed parameters PI, PMIs, and CQI can be reported to the network node (e.g., eNode B), at 1614.

Figure 17:
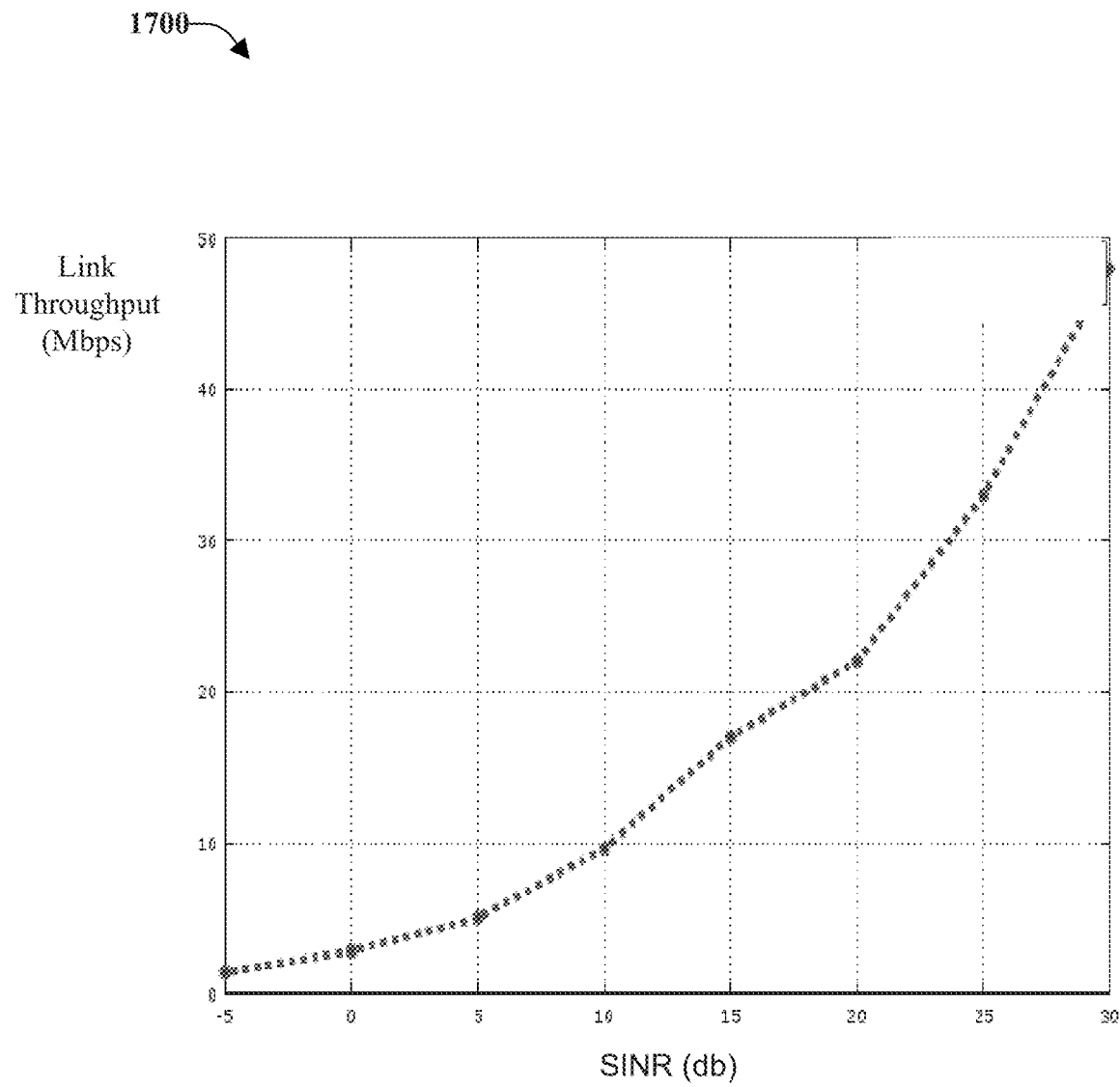
FIG. 17 illustrates an example, non-limiting, graph depicting link simulation results in accordance with one or more embodiments described herein.

FIG. 17 illustrates an example, non-limiting, graph 1700 depicting link simulation results in accordance with one or more embodiments described herein. The graph 1700 comprises a first plotted line for a full search for periodic reporting an a second plotted line for aperiodic reporting. Both the first plotted line and the second plotted line overlay one another. Accordingly, it was observed that the performance of the various aspects discussed herein is substantially the same as the performance of a full search.

Figure 18:
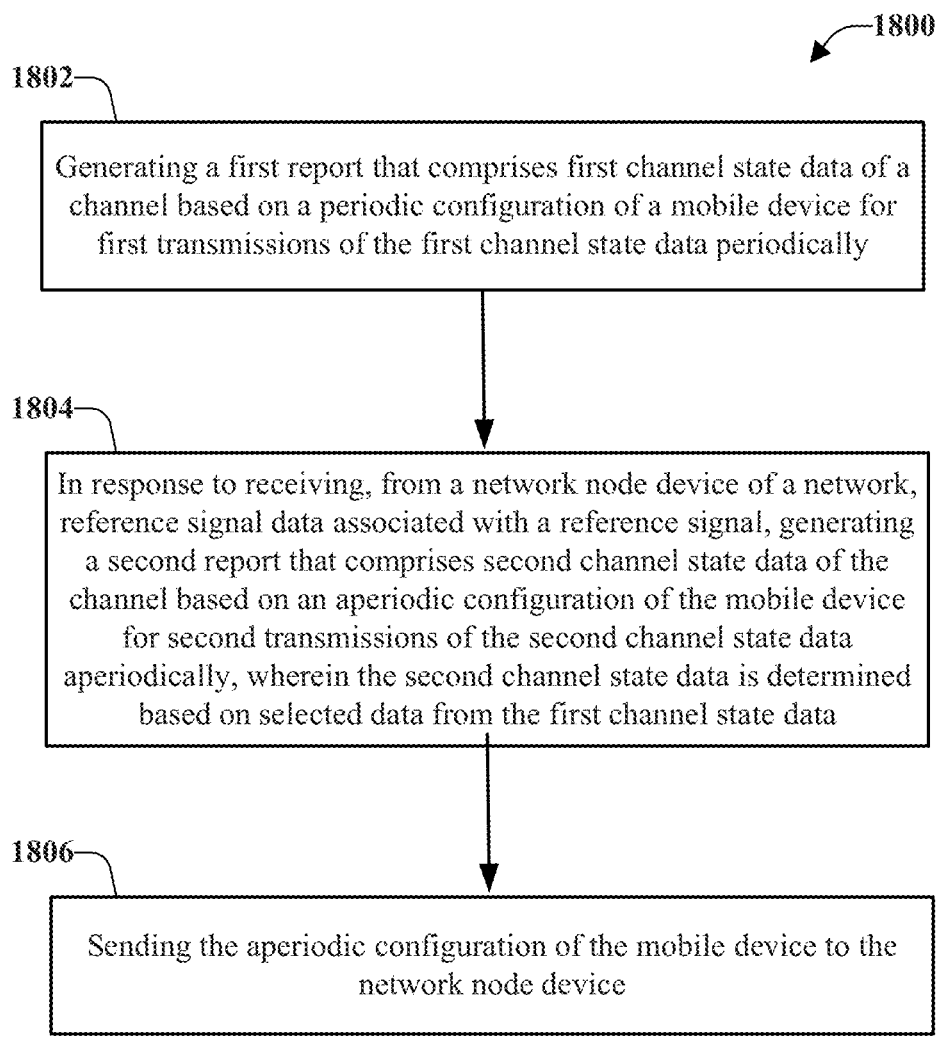
FIG. 18 illustrates an example, non-limiting, method for rank and precoding matrix indication determinations for multiple antennas systems with aperiodic channel state information reporting in accordance with one or more embodiments described herein.

FIG. 18 illustrates an example, non-limiting, method 1800 for rank and precoding matrix indication determinations for multiple antennas systems with aperiodic channel state information reporting in accordance with one or more embodiments described herein. At 1802, a mobile device comprising a processor can generate a first report that can comprise first channel state data of a channel based on a periodic configuration of the mobile device for first transmissions of the first channel state data periodically.

In response to receiving, from a network node device of a network, reference signal data associated with a reference signal, the method 1800 can include, at 1804, generating a second report that comprise second channel state data of the channel. The second report can be generated based on an aperiodic configuration of the mobile device for second transmissions of the second channel state data aperiodically. The second channel state data can be determined based on selected data from the first channel state data. At 1806, the aperiodic configuration of the mobile device can be sent to the network node device Provided herein are aspects related to determining rank indicator and precoding matrix indicator in a multi antenna wireless communication system. A UE can reduce the complexity in finding CSI (e.g. rank information and precoding index) for aperiodic reporting. One or more embodiments can use the RI/PMI computed during the periodic reporting which is periodic in nature for reducing the search space in the codebook thereby reducing the number of computations at the UE side. In accordance with the various aspects, the percentage degradation with respect to full search can be zero, while the complexity can be reduced significantly. Further, there can be battery life improvement at UE side. In addition, UE hardware resources (e.g. memory and processing units) can be partly relieved to allow the UE to efficiently execute additional procedures (e.g. inter-RAT measurements) in parallel with CSI estimation.

Described herein are systems, methods, articles of manufacture, and other embodiments or implementations that can facilitate measurements and radio link monitoring in a 5G network. Facilitating of measurements and radio link monitoring in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 19:
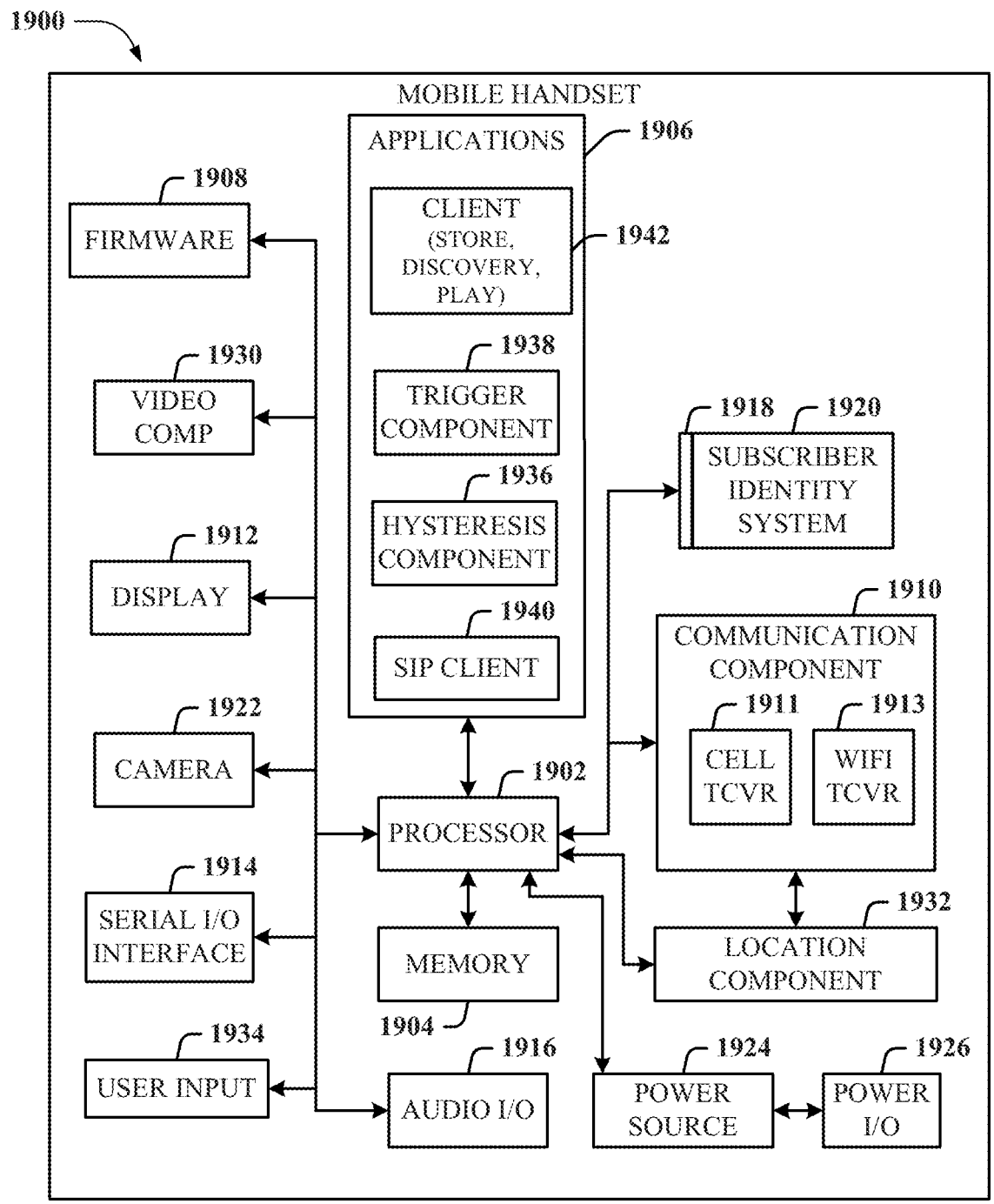
FIG. 19 illustrates an example block diagram of an example mobile handset operable to engage in a system architecture that facilitates wireless communications according to one or more embodiments described herein.

Referring now to FIG. 19, illustrated is an example block diagram of an example mobile handset 1900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1902 for controlling and processing all onboard operations and functions. A memory 1904 interfaces to the processor 1902 for storage of data and one or more applications 1906 (e.g., a video player software, user feedback component software, etc.). Other applications can include voice recognition of predetermined voice commands that facilitate initiation of the user feedback signals. The applications 1906 can be stored in the memory 1904 and/or in a firmware 1908, and executed by the processor 1902 from either or both the memory 1904 or/and the firmware 1908. The firmware 1908 can also store startup code for execution in initializing the handset 1900. A communications component 1910 interfaces to the processor 1902 to facilitate wired/wireless communication with external systems, e.g., cellular networks, VoIP networks, and so on. Here, the communications component 1910 can also include a suitable cellular transceiver 1911 (e.g., a GSM transceiver) and/or an unlicensed transceiver 1913 (e.g., Wi-Fi, WiMax) for corresponding signal communications. The handset 1900 can be a device such as a cellular telephone, a PDA with mobile communications capabilities, and messaging-centric devices. The communications component 1910 also facilitates communications reception from terrestrial radio networks (e.g., broadcast), digital satellite radio networks, and Internet-based radio services networks.

The handset 1900 includes a display 1912 for displaying text, images, video, telephony functions (e.g., a Caller ID function), setup functions, and for user input. For example, the display 1912 can also be referred to as a "screen" that can accommodate the presentation of multimedia content (e.g., music metadata, messages, wallpaper, graphics, etc.). The display 1912 can also display videos and can facilitate the generation, editing and sharing of video quotes. A serial I/O interface 1914 is provided in communication with the processor 1902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1900, for example. Audio capabilities are provided with an audio I/O component 1916, which can include a speaker for the output of audio signals related to, for example, indication that the user pressed the proper key or key combination to initiate the user feedback signal. The audio I/O component 1916 also facilitates the input of audio signals through a microphone to record data and/or telephony voice data, and for inputting voice signals for telephone conversations.

The handset 1900 can include a slot interface 1918 for accommodating a SIC (Subscriber Identity Component) in the form factor of a card Subscriber Identity Module (SIM) or universal SIM 1920, and interfacing the SIM card 1920 with the processor 1902. However, it is to be appreciated that the SIM card 1920 can be manufactured into the handset 1900, and updated by downloading data and software.

The handset 1900 can process IP data traffic through the communications component 1910 to accommodate IP traffic from an IP network such as, for example, the Internet, a corporate intranet, a home network, a person area network, etc., through an ISP or broadband cable provider. Thus, VoIP traffic can be utilized by the handset 1900 and IP-based multimedia content can be received in either an encoded or decoded format.

A video processing component 1922 (e.g., a camera) can be provided for decoding encoded multimedia content. The video processing component 1922 can aid in facilitating the generation, editing, and sharing of video quotes. The handset 1900 also includes a power source 1924 in the form of batteries and/or an AC power subsystem, which power source 1924 can interface to an external power system or charging equipment (not shown) by a power I/O component 1926.

The handset 1900 can also include a video component 1930 for processing video content received and, for recording and transmitting video content. For example, the video component 1930 can facilitate the generation, editing and sharing of video quotes. A location tracking component 1932 facilitates geographically locating the handset 1900. As described hereinabove, this can occur when the user initiates the feedback signal automatically or manually. A user input component 1934 facilitates the user initiating the quality feedback signal. The user input component 1934 can also facilitate the generation, editing and sharing of video quotes. The user input component 1934 can include such conventional input device technologies such as a keypad, keyboard, mouse, stylus pen, and/or touch screen, for example.

Referring again to the applications 1906, a hysteresis component 1936 facilitates the analysis and processing of hysteresis data, which is utilized to determine when to associate with the access point. A software trigger component 1938 can be provided that facilitates triggering of the hysteresis component 1936 when the Wi-Fi transceiver 1913 detects the beacon of the access point. A SIP client 1940 enables the handset 1900 to support SIP protocols and register the subscriber with the SIP registrar server. The applications 1906 can also include a client 1942 that provides at least the capability of discovery, play and store of multimedia content, for example, music.

The handset 1900, as indicated above related to the communications component 1910, includes an indoor network radio transceiver 1913 (e.g., Wi-Fi transceiver). This function supports the indoor radio link, such as IEEE 802.11, for the dual-mode GSM handset 1900. The handset 1900 can accommodate at least satellite radio services through a handset that can combine wireless voice and digital radio chipsets into a single handheld device.

Figure 20:
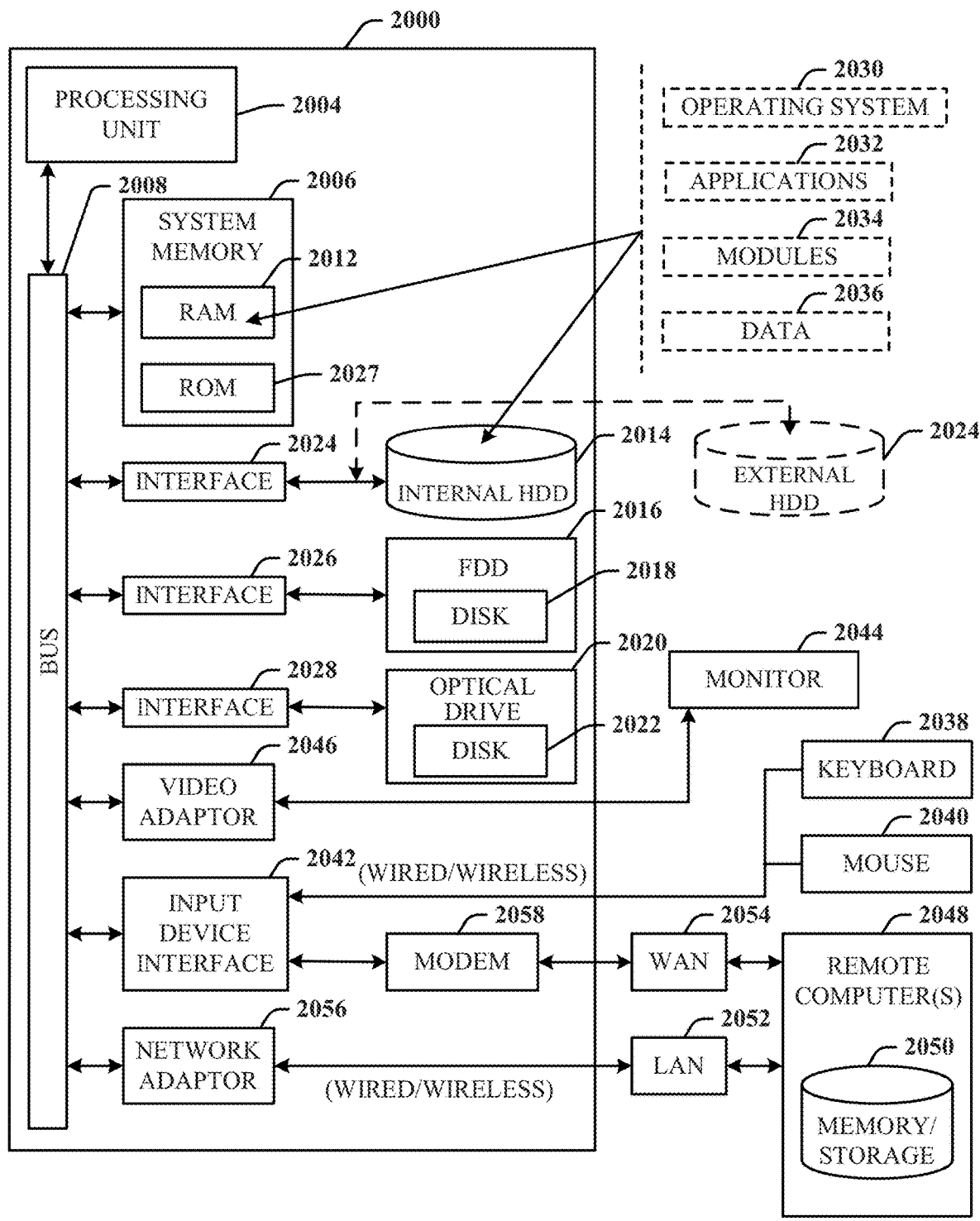
FIG. 20 illustrates an example block diagram of an example computer operable to engage in a system architecture that facilitates wireless communications according to one or more embodiments described herein.

Referring now to FIG. 20, illustrated is an example block diagram of an example computer 2000 operable to engage in a system architecture that facilitates wireless communications according to one or more embodiments described herein. The computer 2000 can provide networking and communication capabilities between a wired or wireless communication network and a server (e.g., Microsoft server) and/or communication device. In order to provide additional context for various aspects thereof, FIG. 20 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 20, implementing various aspects described herein with regards to the end-user device can include a computer 2000, the computer 2000 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes read-only memory (ROM) 2027 and random access memory (RAM) 2012. A basic input/output system (BIOS) is stored in a non-volatile memory 2027 such as ROM, EPROM, EEPROM, which BIOS contains the basic routines that help to transfer information between elements within the computer 2000, such as during start-up. The RAM 2012 can also include a high-speed RAM such as static RAM for caching data.

The computer 2000 further includes an internal hard disk drive (HDD) 2014 (e.g., EIDE, SATA), which internal hard disk drive 2014 can also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 2000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is to be appreciated that the innovation can be implemented with various commercially available operating systems or combinations of operating systems.

A user can enter commands and information into the computer 2000 through one or more wired/wireless input devices, e.g., a keyboard 2038 and a pointing device, such as a mouse 2040. Other input devices (not shown) can include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 through an interface, such as a video adapter 2046. In addition to the monitor 2044, a computer 2000 typically includes other peripheral output devices (not shown), such as speakers, printers, etc.

The computer 2000 can operate in a networked environment using logical connections by wired and/or wireless communications to one or more remote computers, such as a remote computer(s) 2048. The remote computer(s) 2048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2000 is connected to the local network 2052 through a wired and/or wireless communication network interface or adapter 2056. The adapter 2056 can facilitate wired or wireless communication to the LAN 2052, which can also include a wireless access point disposed thereon for communicating with the wireless adapter 2056.

When used in a WAN networking environment, the computer 2000 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 through the input device interface 2042. In a networked environment, program modules depicted relative to the computer, or portions thereof, can be stored in the remote memory/storage device 2050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A user equipment, comprising:
   a processor; and
   a memory that stores executable instructions that, when executed by the processor, facilitate performance of operations, comprising:
      based on data selected from first channel state data for a channel, determining second channel state data for the channel, wherein the second channel state data is based on a periodic configuration of the user equipment, and wherein the determining comprises determining the second channel state data of the channel based on the periodic configuration of the user equipment; and
      sending, to network equipment, the second channel state data as an aperiodic configuration of the user equipment.

2. The user equipment of claim 1, wherein determining the first channel state data of the channel based on the data selected from the second channel state data of the channel comprises reducing a complexity associated with aperiodic reporting according to a defined complexity criterion.

3. The user equipment of claim 2, wherein the data selected from the first channel state data comprises first rank information of the second channel state data and a first precoding matrix index of the second channel state data, and wherein the reducing the complexity comprises:
  determining second rank information and a second precoding matrix index for the aperiodic reporting based on the first rank information and the first precoding matrix index.

4. The user equipment of claim 2, wherein reducing the complexity comprises reducing a search space in a codebook as compared to performing an exhaustive search over the search space in the codebook.

5. The user equipment of claim 2, wherein reducing the complexity comprises reducing a number of computations performed by the user equipment to search a search space, resulting in a reduced number of computations as compared to an exhaustive search performed for periodic reporting.

6. The user equipment of claim 1, wherein the operations further comprise:
  determining a reported rank and a precoding index based on a periodic configuration of the user equipment; and
  determining the aperiodic configuration for the user equipment based on a defined range associated with the reported rank and the precoding index.

7. The user equipment of claim 6, wherein the defined range comprises a first rank that is the reported rank plus one rank and a second rank that is the reported rank minus one rank.

8. The user equipment of claim 6, wherein determining the reported rank and the precoding index comprises using an exhaustive search of a codebook for periodic reporting.

9. A method, comprising:
  generating, by a device comprising a processor, an aperiodic channel state information report based on selected data derived from a periodic channel state information report; and
  facilitating, by the device, a transmission of the aperiodic channel state information report to a network device of a communications network, wherein the selected data comprises first rank information of the periodic channel state information report and a first precoding matrix index of the periodic channel state information report, and wherein generating the aperiodic channel state information report comprises reducing a complexity associated with aperiodic reporting based on determining second rank information and a second precoding matrix index for the aperiodic reporting based on the first rank information and the first precoding matrix index.

10. The method of claim 9, wherein the periodic channel state information report comprises first channel state data of a channel, and wherein generating the aperiodic channel state information report comprises generating second channel state data of the channel based on the selected data.

11. The method of claim 10, wherein the first channel state data of the channel is used by the device for communication with the network device.

12. The method of claim 9, wherein generating the aperiodic channel state information report comprises reducing the complexity associated with the aperiodic reporting based on reducing a search space in a codebook as compared to performing an exhaustive search over the search space in the codebook.

13. The method of claim 9, wherein generating the aperiodic channel state information report comprises reducing the complexity associated with the aperiodic reporting based on reducing a number of computations performed by the device to search a search space, resulting in a reduced number of computations as compared to an exhaustive search performed for periodic reporting.

14. The method of claim 9, further comprising:
  determining, by the device, a reported rank and a precoding index based on a periodic configuration of the device; and
  determining, by the device, an aperiodic configuration for the device based on a defined range associated with the reported rank and the precoding index.

15. The method of claim 14, wherein the defined range comprises a first rank that is the reported rank plus one rank and a second rank that is the reported rank minus one rank.

16. A non-transitory machine-readable medium, comprising executable instructions that, when executed by a processor, facilitate performance of operations, comprising:
  determining first channel state data of a channel based on selected data from second channel state data of the channel, wherein the second channel state data is received prior to the determining the first channel state data, and wherein the first channel state data is based on a periodic configuration of a user equipment, and wherein the determining comprises determining the first channel state data based on the periodic configuration of the user equipment; and
  transmitting, to network equipment, an aperiodic channel state information report that comprises the first channel state data.

17. The non-transitory machine-readable medium of claim 16, wherein the selected data comprises first rank information of the second channel state data and a first precoding matrix index of the second channel state data, and wherein the operations further comprise:
  determining second rank information and a second precoding matrix index for aperiodic reporting based on the first rank information and the first precoding matrix index.

18. The non-transitory machine-readable medium of claim 16, wherein the operations further comprise:
  determining a reported rank and a precoding index based on a periodic configuration; and
  determining an aperiodic configuration based on a defined range associated with the reported rank and the precoding index, wherein the defined range comprises a first rank that is the reported rank plus one rank and a second rank that is the reported rank minus one rank.

19. The non-transitory machine-readable medium of claim 18, wherein determining the reported rank and the precoding index comprises using an exhaustive search of a codebook for periodic reporting.

20. The non-transitory machine-readable medium of claim 16, wherein the transmitting comprises transmitting the aperiodic channel state information report via a channel configured to operate according to a fifth generation network communication protocol.

* * * * *